United States Patent
Ayrapetyan et al.

(10) Patent No.: US 12,373,611 B2
(45) Date of Patent: Jul. 29, 2025

(54) KEY CAPABILITY STORAGE

(71) Applicant: Arm Limited, Cambridge (GB)

(72) Inventors: Ruben Borisovich Ayrapetyan, Cambridge (GB); Jacob Paul Bramley, Cambridge (GB); Kevin Brodsky, Cambridge (GB)

(73) Assignee: Arm Limited, Cambridge (GB)

( * ) Notice: Subject to any disclaimer, the term of this patent is extended or adjusted under 35 U.S.C. 154(b) by 193 days.

(21) Appl. No.: 18/262,458

(22) PCT Filed: Dec. 21, 2021

(86) PCT No.: PCT/GB2021/053398
§ 371 (c)(1),
(2) Date: Jul. 21, 2023

(87) PCT Pub. No.: WO2022/162335
PCT Pub. Date: Aug. 4, 2022

(65) Prior Publication Data
US 2024/0086579 A1    Mar. 14, 2024

(30) Foreign Application Priority Data

Jan. 28, 2021 (GB) .................................... 2101173

(51) Int. Cl.
*G06F 21/00* (2013.01)
*G06F 21/52* (2013.01)
*G06F 21/80* (2013.01)

(52) U.S. Cl.
CPC ............ *G06F 21/805* (2013.01); *G06F 21/52* (2013.01); *G06F 2221/033* (2013.01)

(58) Field of Classification Search
CPC ............................... G06F 21/52; G06F 21/805
See application file for complete search history.

(56) References Cited

U.S. PATENT DOCUMENTS

2020/0133710 A1    4/2020  Barnes
2022/0069988 A1*   3/2022  Ong ...................... H04L 9/0861

OTHER PUBLICATIONS

Combined Search and Examination Report for an International Application No. GB2101173.9, dated Oct. 27, 2021.
International Search Report for an International Application No. PCT/GB2021/053398, dated Mar. 9, 2022.
(Continued)

*Primary Examiner* — Jeffrey C Pwu
*Assistant Examiner* — Thong P Truong
(74) *Attorney, Agent, or Firm* — NIXON & VANDERHYE P.C.

(57) ABSTRACT

Key capability storage circuitry 90 is provided to store a key capability specifying key bounds indicating information indicative of permissible bounds for information specified by any one or more of: a non-capability operand, a capability, or the key capability itself. For a given software compartment executed by the processing circuitry, which lacks a key capability operating privilege associated with at least a portion of the key capability storage circuitry, the processing circuitry is configured to prohibit certain manipulations of the key capability, including a transfer between key capability storage and a memory location selected by the given software compartment. This can help to support temporal safety.

20 Claims, 8 Drawing Sheets

(56) References Cited

OTHER PUBLICATIONS

Jonathan Woodruff et al., CHERI Concentrate: Practical Compressed Capabilities, p. 1-15.
Robert Bedichek, "Some Efficient Architecture Simulation Techniques," Department of Computer Science, University of Washington, Seattle, Washington 98195.
Robert N. M. Watson, "An Introduction to CHERI", Sep. 2019.
Robert N. M. Watson, "Capability Hardware Enhanced RISC Instructions: CHERI Instruction-Set Architecture (Version 8)," Oct. 2020.
Robert N. M. Watson, "Capability Hardware Enhanced RISC Instructions: CHERI Instruction-Set Architecture (Version 7)," Jun. 2019.
Hongyan Xia et al., "CHERIvoke: Characterising Pointer Revocation using CHERI Capabilities for Temporal Memo Safety," Oct. 12-16, 2019, Columbus, OH, USA.
Aaron Lippeveldts, "Linear Capabilities for Cheri," An exploration of the design space, Jun. 7, 2019.

* cited by examiner

|  | restricted | executive (has key capability operating privilege) |
|---|---|---|
| EL2 (hypervisor) | EL2 restricted | EL2 executive |
| EL1 (kernel) | EL1 restricted | EL1 executive |
| EL0 (user) | EL0 restricted | EL0 executive |
increasing key capability operating privilege →
↑ increasing system privilege
FIG. 3
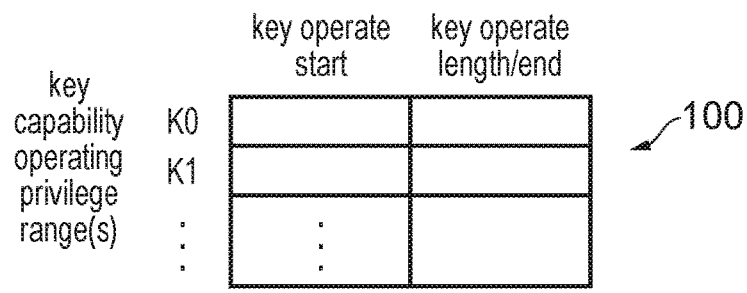
FIG. 4
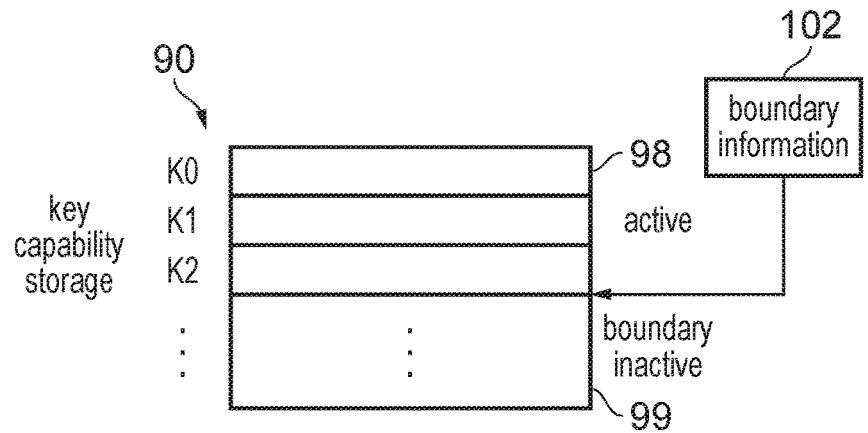
FIG. 5

KEY CAPABILITY STORAGE

The present technique relates the field of data processing.

Memory protection techniques currently in use tend to be relatively coarse-grained in that access permissions for respective regions of memory tend to be defined at the level of an individual process or thread accessing a page of virtual memory, rather than being tied to a particular access to code or data objects being performed within a thread or process.

In a capability-based architecture, capability storage may be provided to store capabilities, where a capability comprises some bounded information (e.g. a pointer) and bounds indicating information for constraining valid use of the bounded information. This approach means that information is referenced to perform an operation such as an access to memory to obtain data or an instruction, the associated metadata for constraining that access is provided in the capability itself. Different accesses to the same address from different instructions within the same process can reference different capabilities and hence be subject to different constraints. This can enable more fine-grained compartmentalisation of software running on the processing circuitry, making it harder for attackers to exploit memory usage errors.

At least some examples provide an apparatus comprising: processing circuitry to perform data processing in response to instructions; capability storage circuitry to store at least one capability specifying bounded information and bounds indicating information indicative of permissible bounds for the bounded information; key capability storage circuitry to store at least one key capability specifying key bounds indicating information indicative of permissible bounds for information specified by any one or more of: a non-capability operand, a capability stored in the capability storage circuitry, and the key capability itself; and capability checking circuitry to determine whether an operation to be performed by the processing circuitry is allowed based on bounds checking using the bounds indicating information and the key bounds indicating information; in which: for a given software compartment executed by the processing circuitry, which lacks a key capability operating privilege associated with at least a portion of the key capability storage circuitry, the processing circuitry is configured to prohibit the given software compartment from causing the processing circuitry to perform one or both of: a first transfer operation to transfer a key capability from said at least a portion of the key capability storage circuitry to the capability storage circuitry or a memory location selected by the given software compartment; and a second transfer operation to transfer a key capability to said at least a portion of the key capability storage circuitry from the capability storage circuitry or the memory location selected by the given software compartment.

At least some examples provide a method comprising: storing, in capability storage circuitry, at least one capability specifying bounded information and bounds indicating information indicative of permissible bounds for the bounded information; storing, in key capability storage circuitry, at least one key capability specifying key bounds indicating information indicative of permissible bounds for information specified by any one or more of: a non-capability operand, a capability stored in the capability storage circuitry, and the key capability itself; and determining whether an operation to be performed by processing circuitry is allowed based on bounds checking using the bounds indicating information and the key bounds indicating information; in which: for a given software compartment executed by the processing circuitry, which lacks a key capability operating privilege associated with at least a portion of the key capability storage circuitry, the processing circuitry prohibits the given software compartment from causing the processing circuitry to perform one or both of: a first transfer operation to transfer a key capability from said at least a portion of the key capability storage circuitry to the capability storage circuitry or a memory location selected by the given software compartment; and a second transfer operation to transfer a key capability to said at least a portion of the key capability storage circuitry from the capability storage circuitry or the memory location selected by the given software compartment.

At least some examples provide a computer program to control a host data processing apparatus to provide an instruction execution environment for execution of target code; the computer program comprising: instruction decoding program logic to decode instructions of the target code to control the host data processing apparatus to perform data processing in response to the instructions of the target code; storage emulating program logic to maintain, in host storage circuitry of the host data processing apparatus: a capability storage structure to store at least one capability specifying bounded information and bounds indicating information indicative of permissible bounds for the bounded information; and a key capability storage structure to store at least one key capability specifying key bounds indicating information indicative of permissible bounds for information specified by any one or more of: a non-capability operand, a capability stored in the capability storage structure, and the key capability itself; and capability checking program logic to determine whether an operation to be performed in response to the instructions of the target code is allowed based on bounds checking using the bounds indicating information and the key bounds indicating information; in which: for a given software compartment of the target code, which lacks a key capability operating privilege associated with at least a portion of the key capability storage structure, the instruction decoding program logic is configured to prohibit the given software compartment from causing the host data processing apparatus to perform one or both of: a first transfer operation to transfer a key capability from said at least a portion of the key capability storage structure to the capability storage structure or a simulated memory location selected by the given software compartment; and a second transfer operation to transfer a key capability to said at least a portion of the key capability storage circuitry from the capability storage structure or the simulated memory location selected by the given software compartment.

A computer-readable storage medium may store the computer program. The computer-readable storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus;

FIG. 3 illustrates an example of operating states of the apparatus associated with different levels of privilege, including some states which are considered to have a key capability operating privilege;

FIG. 4 shows an alternative example of assigning the key capability operating privilege by using range information;

FIG. 5 shows an example of boundary information for controlling which portions of key capability storage are active or inactive;

Figure 1:
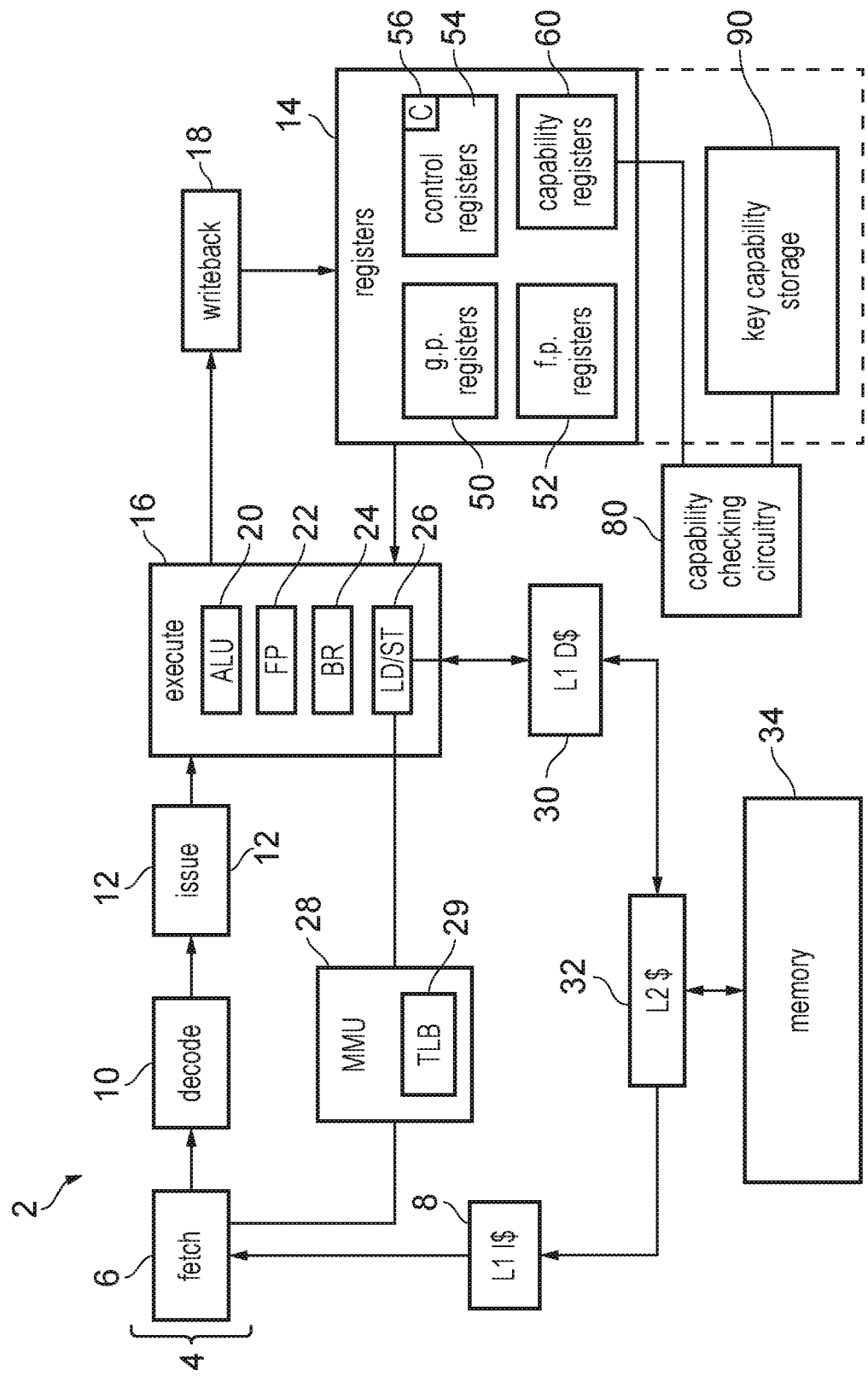

Capabilities can be useful for defining bounds which limit the valid use of bounded information. For example the bounded information could be a pointer and so the capability may be used to control whether the pointer can be used to access memory. It is also possible to use capabilities to police usage of information other than pointers.

Capabilities can be useful for giving a particular software compartment permanent rights to carry out some action such as accessing a given range of memory addresses. This can be done by providing that software compartment with the relevant capability defining bounds which indicate that the corresponding action is permissible. For example, this can be useful to ensure spatial safety in access to memory.

However, achieving temporal safety may be more difficult. Sometimes it may be desirable to allow a given software compartment to perform a given action for a limited time period and then later that same software compartment may no longer be allowed to carry out the action. For example a compartment may be given temporary access to a particular address range in memory, but later it may be desirable to remove the right to access that address range. It is difficult to achieve temporal safety using typical capability schemes because in such schemes software compartments are generally allowed to copy capabilities between memory and registers, or between different regions of memory, so that it is difficult to revoke access which was previously permitted using a particular capability in an efficient manner. Revoking previously granted capabilities may in some cases require the entire address space to be scrubbed to clear it of any remaining capabilities that may have been copied by a software compartment and this is a costly operation in terms of performance.

In the examples below, an apparatus has processing circuitry to perform data processing in response to instructions and capability storage circuitry to store at least one capability specifying bounded information and bounds indicating information indicative of permissible bounds for the bounded information. Key capability storage circuitry is provided, to store at least one key capability specifying key bounds indicating information. The key bounds indicating information indicates permissible bounds for information, with the information subject to those bounds being specified by any one or more of: (i) an non-capability operand, (ii) a capability stored in the capability storage circuitry, and (iii) the key capability itself. Capability checking circuitry is provided to determine whether an operation to be performed by the processing circuitry is allowed, based on bounds checking using the bounds indicating information specified in at least one capability of the capability storage circuitry and the key bounds indicating information of at least one key capability stored in the key capability storage circuitry.

Some operations may be checked by the capability checking circuitry using only the bounds indication information of a capability and not the key bounds indicating information of a key capability. Other operations may be checked using both the bounds indicating information and the key bounds indicating information. In some implementations it may also be possible for some operations to be policed by the key bounds indicating information but not the bounds indicating information. Hence, in general the capability checking circuitry supports checks using both types of bounds indicating information, but does not necessarily need to use both types on every occasion on which bounds checking is performed.

Some software compartments executed by the processing circuitry may be assigned a key capability operating privilege associated with at least a portion of the key capability storage circuitry. Other software compartments may lack that key capability operating privilege.

For a given software compartment executed by the processing circuitry, which lacks the key capability operating privilege associated with at least a portion of the key capability storage circuitry, the processing circuitry may prohibit that given software compartment from causing the processing circuitry to perform one or both of: a first transfer operation to transfer a key capability from said at least a portion of the key capability storage circuitry to the capability storage circuitry or a memory location selected by the given software compartment; and a second transfer operation to transfer a key capability to said at least a portion of the key capability storage circuitry from the capability storage circuitry or the memory location selected by the given software compartment.

Hence, the key capability operating privilege assigns the right to control transfers of key capabilities between the key capability storage circuitry and either memory or the capability storage circuitry. By restricting such transfers this means that the key capabilities can be used to assign temporary access to certain pieces of information or provide temporary rights to carry out an action. This can be done by a process which has the key capability operating privilege defining the relevant key bounds indicating information in the key capability storage circuitry.

As software compartments which lack the key capability operating privilege are not able to transfer that key capability out to an arbitrarily selected location in memory or to the capability storage circuitry (or alternatively, could be allowed to transfer the key capability to memory but may not be allowed to subsequently reload the key capability back to the key capability storage circuitry at a later time), this means that if the rights granted by that key capability are subsequently revoked then it is ensured that the corresponding software compartment can no longer carry out the relevant action, unlike for the regular capabilities as discussed above for which there may generally be a possibility of capabilities being copied out to memory and later reloaded. Hence, this provides a way of providing temporal safety.

Note that while software compartments which lack the key capability operating privilege may be prohibited from causing the processing circuitry to transfer key capabilities between the key capability storage circuitry and a memory location selected by the given software compartment, this does not exclude the given software compartment being allowed to cause the processing circuitry to transfer key capabilities between key capability storage circuitry and a memory location not selected by the given software compartment. For providing temporal safety it is enough that the key capability cannot be transferred to, or loaded from, an arbitrarily selected memory location which is selected under control of the given software compartment. However, it may still be possible that sometimes key capabilities are transferred to/from a location in memory not selected by the given software compartment which lacks the key capability operating privilege. For example, in some implementations the key capability storage circuitry may have a limited capacity and so, to support a larger number of key capabilities being used by software, sometimes key capabilities may be spilled to memory and then later loaded back into the key capability storage circuitry. This may be done under hardware control or under control of a software compartment which has the key capability operating privilege. If under hardware control then operations performed by a software compartment which lacks the key capability operating privilege may cause that hardware to save key capabilities out to memory or load key capabilities into memory, but in that case the location to which the key capabilities are saved or from which the key capabilities are loaded may not be selected by the given software compartment, but may instead be fixed or variable under control of a software compartment of higher privilege. This means that even in an implementation which supports such spilling and filling of key capabilities, ensuring temporal safety can be more efficient because even if a few memory locations to which key capabilities can be spilled are scrubbed when revoking a key capability, this may be a relatively small region of memory known to a software compartment of higher privilege, so does not require scrubbing of the entire address space to guard against software compartments without the key operating privilege having saved the key capability to an unknown location in memory.

Also, it is not essential for transfers of key capabilities between an arbitrary location in memory and the key capability storage to be restricted in both directions for a software compartment not having the key capability operating privilege. Some implementations may prohibit stores of key capabilities from key capability storage to an arbitrary location in memory, but allow loads of key capabilities from an arbitrary location in memory to key capability storage. Other implementations may be the other way round and prohibit the software compartment not having the key capability operating privilege from performing loads of key capabilities but may allow stores of key capabilities. Other implementations may prevent that software compartment performing both loads and stores of key capabilities.

In some implementations the key capabilities may be referenced independently of any capabilities stored in the capability storage circuitry, so that sometimes the capability checks may consider the key bounds indicating information without considering bounds indicating information of a capability stored in the capability storage circuitry. For example, some implementations could allow a key capability to provide bounded information itself, so that the information checked using the bounds indicated by the key bounds indicating information could be information provided by the key capability itself.

However, in at least one mode of operation of the processing circuitry, in response to an operation to be performed by the processing circuitry with reference to a given capability stored in the capability storage circuitry (which could be a general purpose capability or could be a program counter capability or default capability as discussed in the examples below) the capability checking circuitry may perform combined capability bounds checking, to check whether a non-capability operand or the bounded information of the given capability satisfies both the permissible bounds indicated by the bounds indicating information of the given capability and the permissible bounds indicated by the key bounds indicating information of at least one key capability stored in the key capability storage circuitry. Note that in the case when the given capability is the default capability described later, then the given capability is used to check whether a non-capability operand satisfies the permissible bounds indicated by the bounds indicating information of the given capability.

Hence, in some cases the key capabilities may provide additional permissions to be applied in combination with any permissions or bounds enforced by the capabilities of the capability storage circuitry. The key capabilities can provide an extra layer of control over permissions/bounds that can be used to temporarily assign access rights within the scope of other capabilities, but in some cases may not be able to permit an action to be performed if it would also not be permitted based on regular capability checks using capabilities in the capability storage circuitry. Hence, in some cases the requested operation may be permitted if it satisfies both the bounds checks performed based on a capability of the capability storage circuitry and the key bounds checks performed based on key bounds indicating information of a key capability stored in the key capability storage circuitry.

In at least one mode of operation, in response to the processing circuitry requesting a memory access to a target address, the capability checking circuitry may determine that the memory access is not permitted when there is no valid key capability stored in the key capability storage circuitry for which the target address is within permissible bounds indicated by the key bounds indicating information. Hence, in this case successful access to memory may rely on there being a valid key capability defined in the key capability storage circuitry which permits that access.

As mentioned below, some implementations may also support the concept of key capabilities being active or inactive (orthogonal to being valid or invalid), and so in that case inactive key capabilities may not be used to enable memory accesses to be permitted, in addition to invalid key capabilities not being able to permit access. In such embodiments memory accesses may not be permitted when there is no active and valid key capability stored in the key capability storage circuitry which indicates permissible bounds including the target address.

Either way, by providing a mode where, to allow a memory access to a target address, it is a requirement for a valid key capability to be present which has bounds defining a range including the target address, this can be useful for providing guarantees of temporal safety.

Note that in some implementations the processing circuitry may also have at least one other mode where a memory access is permitted even if there is no valid key capability in the key capability storage circuitry. For example this could be a mode where no capability checks are required at all.

As well as restricting the ability to transfer key capabilities to or from the key capability storage circuitry, the key capability operating privilege may also provide the right to create new key capabilities. Hence, the processing circuitry may prohibit a given software compartment which lacks the key capability operating privilege from creating a new capability.

The processing circuitry may support one or more key capability manipulating instructions, for manipulating key capabilities stored in the key capability storage circuitry. Such manipulations may include creating new key capabilities, modifying existing key capabilities (for example to change the permissions or bounds indicated by the key capabilities), or loading or storing key capabilities to transfer them between the key capability storage circuitry and a selected location in memory selected by the software compartment which has the key capability operating privilege. The processing circuitry may signal a fault in response to an attempt, by a software compartment lacking the key capability operating privilege for a given portion of the key capability storage circuitry, to execute a key capability manipulating instruction for manipulating a key capability stored in the given portion of the key capability storage circuitry.

In some cases the processing circuitry may also support capability manipulating instructions for manipulating capabilities stored in the capability storage circuitry. The key capability manipulating instructions may have a different instruction encoding to the capability manipulating instructions (e.g. the key capability manipulating instructions could have different opcodes to the capability manipulating instructions, or a field within the instruction could specify whether the instruction is for manipulating a key capability or a regular capability). Hence, some software compartments which might be allowed to execute capability manipulating instructions may nevertheless not be allowed to execute key capability manipulating instructions.

There are a number of ways of controlling which software compartments are assigned the key capability operating privilege. In one example the processing circuitry may execute a software compartment in one of an executive state and a restricted state. Software compartments executed in the executive state may be considered to have the key capability operating privilege, while software compartments executed in the restricted state may lack the key capability operating privilege. Whether or not a software compartment executes in the executive state or the restricted state may be determined independently of one or more other privilege states assigned to software compartments. For example the executive state and the restricted state may be orthogonal to exception states which control privilege of access to certain registers (other than the key capability storage circuitry).

In other examples, range information could be used to define at least one range of instruction addresses associated with the key capability operating privilege. In this case when executing instructions from a given software compartment, if those instructions have instruction addresses within a range defined as having the key capability operating privilege, then that portion of the software compartment is determined to have the key capability operating privilege and so can execute the key manipulating instructions which may permit it to trigger transfers of key capabilities between key capability storage and capability storage or memory. Other software compartments executing with instructions not in the ranges defined by the key capability privilege range information may not be allowed to manipulate key capabilities as they lack the key capability operating privilege.

In some implementations the key capability operating privilege may be assigned in a unified manner for the entire capacity of the key capability storage circuitry. In this case software compartments are either permitted to manipulate key capabilities in the entire key capability storage circuitry or lack the key capability operating privilege so that they cannot manipulate the key capabilities.

However it is also possible for the processing circuitry to be configured to control assignment of the key capability operating privilege separately for different portions of the key capability storage circuitry. In this case a software compartment could have the key capability operating privilege for one part of the key capability storage circuitry but may lack the key capability operating privilege for another part of the key capability storage circuitry. For example, this could be done by providing separate indications of ranges of addresses assigned the key capability operating privilege for different portions of the key capability storage circuitry, or by having a number of orthogonal executive/restricted state indications corresponding to the different parts of the key capability storage circuitry. By assigning separate key capability operating privileges for different parts of the key capability storage circuitry, this can support the co-existence of a number of different controlling software compartments which may wish to assign different key capabilities without being able to manipulate each other's key capabilities.

In some examples, key capabilities could be distinguished from regular capabilities in that they are identified as a key-capability-type of capability. For example there could be a capability type identifier which may have a value identifying the capability as a key capability (at least when the key capability is stored in memory, the capability type identifier could be stored with it). In some implementations key capabilities may have the same format as regular capabilities, other than being distinguished as the key-capability-type. In other examples, a different format or encoding could be used for the key-capability-type compared to normal capabilities. By assigning a specific key-capability-type this means that when capabilities or key capabilities are written out to memory (in the case of the key capability, under control of a software compartment having the key capability operating privilege), the key-capability-type could indicate that that capability should not subsequently be transferred back to the key capability storage by a software compartment which lacks the key capability operating privilege, for example. Hence, in response to an instruction executed by the processing circuitry to request transfer of a target capability from memory to the capability storage circuitry, the processing circuitry may determine whether the target capability is a key-capability-type of capability and if so reject the transfer.

Other examples may not need to assign a particular key-capability-type of capability, as for example the rights available for manipulating key capabilities compared to regular capabilities could instead be controlled based on which types of instructions are allowed to be executed for particular software compartments depending on whether they have the key capability operating privilege. Nevertheless, defining a key-capability-type can make it simpler to ensure that capabilities stored in memory are not inadvertently copied to the capability storage circuitry to act as regular capabilities which could be undesirable.

Although in some cases the key capabilities could be defined with the same format as regular capabilities, it can be useful to allow key capabilities to have a different capability format to a capability stored in the capability storage circuitry. For example it may not be necessary for the key capability to specify any bounded information as in modes where the key capability bounds are applied in combination with capability bounds, the information checked using the key capability bounds could be stored in a non-capability operand or capability, not the key capability itself. Also, the key capability could represent its bounds in a different format to the bounds of a capability register. For example, the key bounds information could be represented in a less compressed format than the bounds information for regular capabilities, which could be useful for allowing key bounds information to be checked more quickly. Also, the range of different kinds of permissions that may be indicated in a key capability may be different to the range of permissions available for regular capabilities.

In some examples, in at least one mode of operation of the processing circuitry: the capability checking circuitry determines, for an operation to be performed by the processing circuitry using a non-capability operand or a given capability, whether private/shared information indicates that the non-capability operand or the given capability is private or shared; when the non-capability operand or the given capability is shared, the capability checking circuitry determines whether the operation is permitted based on whether the non-capability operand or the bounded information of the given capability satisfies key bounds indicating information of at least one key capability stored in the key capability storage circuitry; and when the non-capability operand or the given capability is private, the capability checking circuitry determine whether the operation is permitted independent of whether the non-capability operand or the bounded information of the given capability satisfies key bounds indicating information of at least one key capability stored in the key capability storage circuitry.

By providing the ability to mark a non-capability operand or capability as private, to indicate that it will not be shared with other compartments and so need not be subject to key bounds checking, this can reduce the overhead of implementing key capability checks. When private capabilities are to be used within the compartment that owns the relevant address range then checks against key bounds may be redundant and so can be avoided to save power. There may be a variety of ways of marking certain non-capability or capability operands as shared or private. For example, the private/shared information could be a field associated with the register providing the non-capability operand or the given capability, which indicates whether the non-capability operand or the given capability is private or shared. Alternatively, private/shared range information could be provided to define a range of addresses for which operand values in that range are considered private or shared.

The processing circuitry may convert a capability from private to shared when one of the following event occurs: the capability is made accessible to a software compartment not previously having access to the capability; the capability is loaded to the capability storage circuitry from memory under control of a shared capability; or the capability is stored to memory from the capability storage circuitry under control of a shared capability. The enforcement of the conversion of the capability from private to shared could be implemented in software in some cases, but it may be stronger if there is hardware of the processing circuitry which enforces the requirement for the capability to become shared when it is shared with another software compartment or transferred between capability storage circuitry and memory under control of a shared capability. Hardware enforcement of the requirement to make the capability become shared when made accessible to the software compartment could be implemented by prohibiting storage of a private capability to memory when referenced through a shared capability, which may then impose a requirement that software should make the private capability shared before writing it to memory. Alternatively, software could simply request the transfer of the capability to memory or a load of a capability from memory, and if this is done under a control of a shared capability then the processing circuitry may, enforced by hardware circuit logic, automatically convert the private/shared information to indicate a shared capability. This approach ensures that capabilities made accessible to more than one software compartment should not continue to be regarded as private, to avoid the key bounds checking being circumvented.

In some examples, the capability checking circuitry may have access to key capability active status information which indicates which portions of the key capability storage circuitry are active or inactive. The capability checking circuitry may determine whether an operation subject to key capability checking is permitted, based on one or more key capabilities stored in an active portion of the key capability storage circuitry, independent of one or more key capability stored in an inactive portion of the key capability storage circuitry. By providing the ability to mark certain portions of the key capability storage circuitry as inactive, this means that it is possible to temporarily mark a certain key capability as not being used for key capability checking, without needing to completely invalidate that key capability. This can be useful, for example, if there are key capabilities which should be accessible to a calling software compartment but should not be accessible to a called compartment called in a function call by the calling compartment. In that case it may be preferable to disable the permissions indicated by a particular key capability for a time and later re-enable them. The operations to invalidate a key capability before calling the compartment and then later reconstruct the same key capability on returning from the called compartment can be slow. By providing the ability for key capabilities to be designated as inactive but nevertheless remain valid, this means that on returning from the called compartment the relevant key capability can simply be activated again, avoiding the need to recreate the key capability. This improves performance.

The key capability active status information could indicate the active or inactive portions in different ways. In one example, the key capability active status information could be a set of active/inactive flags associated with respective portions of the key capability storage circuitry, which each indicate whether a corresponding portion is active or inactive. However, in some examples it may not be necessary to individually set each portion of the key capability storage circuitry as active or inactive and it may be sufficient to provide boundary information which indicates a boundary between the at least one active portion lying on one side of the boundary and the at least one inactive portion of the key capability storage circuitry lying on the other side of the boundary. For example the boundary information could indicate a register number or an address that marks the position of the boundary between active and inactive key capabilities.

In some examples, for an operation subject to key capability checking to be performed with reference to a given non-capability operand or a given capability, the capability checking circuitry may determine, based on a key capability check success indicator associated with the given non-capability operand or the given capability, whether a key capability check is required. The key capability check success indicator indicates whether the key capability check for the given non-capability operand or the given capability has previously been determined to be successful. It may be relatively common that the same key capability needs to be checked on multiple occasions for a number of accesses using the same pointer or for repeated uses of other types of information whose usage is policed based on the key bounds information. By providing a key capability check success indicator which records whether key capability checks have previously been determined to be successful, this avoids the overhead of repeating the key capability check again in future, saving power.

At least one of the processing circuitry and the capability checking circuitry may clear or re-compute the key capability check success indicator in response to an update to the given non-capability operand, the given capability, or a key capability. Hence, when the operand, capability or key capability is updated, the previous key capability check may no longer be valid and so the key capability check success indicator may be cleared to ensure that a subsequent use of the non-capability operand or capability is subject to key capability checks. There could also be other scenarios in which the key capability check success indicator is cleared or re-computed. For example this could be triggered by execution of a dedicated software instruction having an encoding allocated to represent an explicit request to re-compute or clear the key capability check success indicator. Also, if a software compartment having the key capability operating privilege updates a key capability in the key capability storage circuitry, then it is possible that any previous key capability checks may no longer be valid, and so the key capability check success indicator can then be cleared or re-computed.

In some cases the execution of the key capability check success indicator clearing or re-computation instruction and the update to the key capability storage may trigger clearing or re-computation of the key capability check success indicators associated with more than one non-capability operand or capability. For example, a number of registers for providing non-capability operands or capabilities may be provided with key capability check success fields and these fields may all be cleared if the software instruction is executed for requesting the clearing or re-computing of the key capability check success indicator, or if the key capability storage circuitry is updated.

In one example, the processing circuitry or the capability checking circuitry sets effective bounds information associated with a given non-capability operand or a given capability to indicate effective bounds corresponding to an intersection between the permissible bounds indicated by the key bounds indicating information specified by at least one key capability and the permissible bounds indicated by default bounds indicating information associated with the given non-capability operand or the bounds indicating information specified by the given capability; and in response to an operation subject to key capability checking to be performed with reference to a given non-capability operand or a given capability, the capability checking circuitry performs bounds checking with reference to the effective bounds information associated with the given non-capability operand or the given capability. This approach can allow explicit key capability checking to be omitted for subsequent operations using the given non-capability operand or given capability, so that these operations can be checked based on the effective bounds information without needing to reread the key capability storage to identify the key bounds information. Again, the effective bounds information may be cleared in response to events such as invalidation or manipulation of any key capability or updates to the default bounds indicating information or bounds indicating information that was used to set the effective bounds information. An indicator associated with the given non-capability operand or given capability may indicate whether the effective bounds information is valid (in some cases this may be the same indicator that also functions as the key capability check success indicator mentioned above). For the effective bounds information associated with a given non-capability operand, although it is possible to specify different effective bounds information for different non-capability operands, some implementations may specify the effective bounds information for non-capability operands as a shared field associated with the default capability that specifies the default bounds indicating information for use in checking non-capability operands, so it is not essential for different general purpose registers for storing non-capability operands to each be provided with a separate field for specifying effective bounds information.

The key capability storage can be implemented in different ways. In some examples the key capability storage circuitry may comprise at least one key capability register. The at least one key capability register may be an architecturally visible register. In the case where key capability storage is implemented using architecturally visible registers (which can be explicitly read or written to by software having the key capability operating privilege), it is also possible to support spilling and filling of key capabilities between the key capability registers and memory, to deal with the fact that software may wish to define a greater number of key capabilities than can be supported within the available register capacity. The spilling and filling could be performed either implicitly by an arbiter or kernel in software, or automatically by hardware circuit logic which automatically transfers key capabilities to or from a memory area dedicated for this purpose. A memory area could be allocated (by a software compartment having the key capability operating privilege) for each thread of execution to provide the locations to which key capabilities are spilled if they need to be evicted from the key capability registers.

Also, the key capability storage circuitry could comprise at least one region of memory designated as a key capability storage region. In this case it may not be essential to provide any architecturally visible key capability registers. From an architectural point of view, software having the key capability operating privilege sets the key capabilities by writing to the designated key capability storage region in memory. However, some micro-architectural implementations could choose to implement architecturally hidden registers (which are not visible to software) to act as a cache for caching information from the key capability storage region, which can help to improve performance by reducing delays in accessing the relevant key capability information. Nevertheless, in an implementation where the architecturally visible view of the key capability storage circuitry is as a region in memory then this may be useful to permit some implementations to save circuit area by not implementing designated registers for the key capability storage.

Other implementations may use a combination of the key capability registers and the region of memory. For example, from an architectural point of view visible to software, there could be a number of key capability registers available, and also a region of memory designated for handling further key capabilities that cannot fit in the key capability registers.

As mentioned above, software compartments which lack the key capability operating privilege may not be allowed to perform one or both of the first and second transfer operations discussed above, so may not be allowed to transfer key capabilities between the key capability storage circuitry and the capability storage circuitry, or transfer key capabilities between the key capability storage circuitry and a memory location selected by the given software compartment.

In contrast, for regular capabilities stored in the capability storage circuitry, a software compartment lacking the key capability operating privilege may still be allowed to cause the processing circuitry to transfer regular (non-key) capabilities between the capability storage circuitry and an arbitrarily selected memory location selected by the given software compartment. For example the given software compartment lacking key capability operating privilege may be allowed to freely load or store regular capabilities as needed (subject to any other constraints on whether the relevant areas of memory are allowed to be accessed as determined based on any memory protection requirements and any regular capability checks and key capability checks). Assuming any other checks are passed, it is possible for the given software compartment lacking the key capability operating privilege to be allowed to cause the transfer of the regular capability. In contrast, the ability to cause transfers of key capabilities is more restricted so as to provide the temporal safety as discussed earlier.

The bounded information of a given capability may comprise any information for which usage is to be controlled. However, it could be particularly useful for the bounded information to comprise a pointer, which can be used to indicate an address in memory. The bounds information may define permissible bounds for the address value of the pointer. Some implementations may allow the pointer field also to be used to convey other information. For example a sealing capability may be a type of capability identified as having the sealing permission which gives permission to use the sealing capability to seal other capabilities. The pointer field of the sealing capability may define an object type identifier to be applied to the sealed capability and the bounds information of the sealing capability may indicate a range of object type values that are allowed to be specified as the object type identifier by the sealed capability. This can be useful to allow the sealed capability to act as a token indicating permission to carry out an action (which may not necessarily be an action to request access to memory), with the object type identifier of the sealed capability distinguishing that token from other tokens represented by sealed capabilities. Hence, it would be appreciated that while often the bounded information may comprise a pointer, there can also be other uses of capabilities to provide bounded information and protect its usage by defining associated bounds within the capability.

Capabilities may also specify one or more permission type indicators which indicate one or more types of operations for which permission may be granted using the capability. For example the permission type indicators could indicate whether a read of data from memory may be determined as allowed based on the capability, whether a write to memory may be determined as allowed based on the capability, or whether the capability can give permission to seal other capabilities as discussed above.

Similarly, key capabilities may also specify at least one permission type indicator indicative of one or more types of operations for which permission may be granted using the key capability. The range of permission types indicated in the key capability could be the same as the range of permission types indicated for a regular capability, or could be different.

The techniques discussed above can be implemented in a hardware apparatus which has circuit hardware implementing the processing circuitry, capability storage circuitry, key capability storage circuitry and capability checking circuitry discussed above.

However, in another example the same techniques may be implemented in a computer program (e.g. an architecture simulator or model) which may be provided for controlling a host data processing apparatus to provide an instruction execution environment for execution of instructions from target code. The computer program may include instruction decoding program logic for decoding instructions of the target code so as to control a host data processing apparatus to perform data processing. The instruction decoding program logic emulates the functionality of the instruction decoder of a hardware apparatus as discussed above, so that the host data processing apparatus can execute target code to give equivalent results to if the target code was executed on the processing circuitry of the hardware apparatus. Also, the program may include storage emulating program logic which maintains, in host storage circuitry of the host apparatus (e.g. registers and/or memory), a capability storage structure and key capability storage structure which emulate the capability storage circuitry and key capability storage circuitry respectively as described above. Also, the computer program includes capability checking program logic which performs similar functions in software to the operations performed by the capability checking circuitry discussed above.

Hence, such a simulator computer program may present, to target code executing on the simulator computer program, a similar instruction environment to that which would be provided by an actual hardware apparatus, even though there may not be any actual hardware providing these features in the host computer which is executing the simulator program. This can be useful for executing code written for one instruction set architecture on a host platform which does not actually support that architecture. Also the simulator can be useful, during development of software for a new version of an instruction set architecture, as it means software development may be performed in parallel with development of hardware devices supporting the new architecture. This can allow software to be developed and tested on the simulator so that software development can start before the hardware devices supporting the new architecture are ready yet.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU) 28 is provided for performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and may also specify access permissions which govern whether a given process executing on the pipeline is allowed to read, write or execute instructions from a given memory region. The access permissions specified in the page tables accessed by the MMU 28 may be relatively coarse-grained in that they may specify permissions for a particular memory region which apply to an entire software process as a whole, so that it is not efficient to use the page tables to provide different levels of access permissions for different sub-portions of instructions within a software process.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

Figure 2:
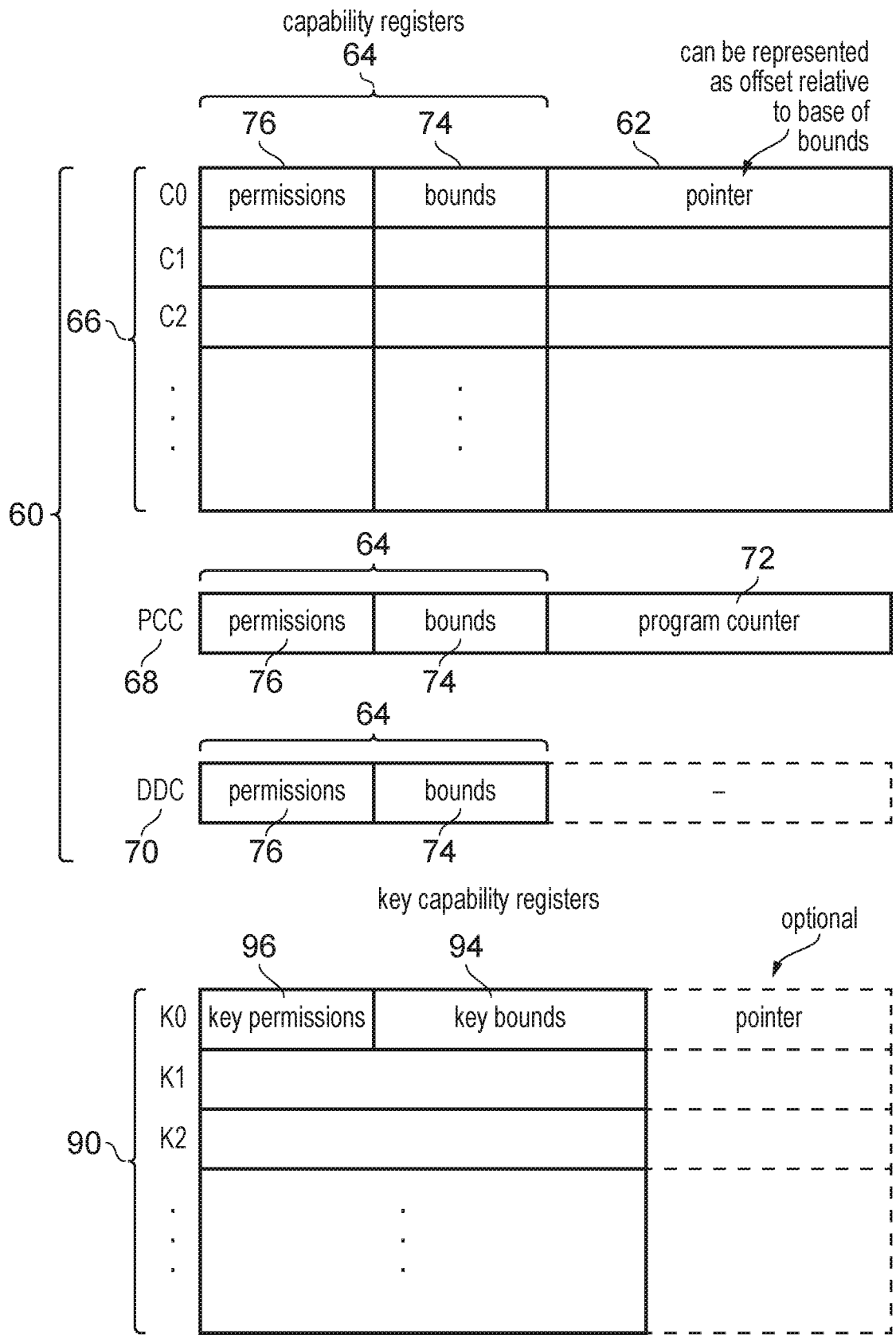
FIG. 2 shows an example of registers of the apparatus, including key capability registers which are an example of key capability storage circuitry.

FIGS. 1 and 2 illustrate an example of some of the registers 14 of the processing apparatus 2. It will be appreciated that FIGS. 1 and 2 does not show all of the registers which may be provided and there could be additional registers.

As shown in FIG. 1, the registers 14 may include a set of general purpose integer registers 50 for storing integer operands and results of processing operations performed in response to integer processing instructions, and a set of floating point registers 52 for storing floating point operands or results. Some implementations may not support floating point processing and in this case the floating point registers can be omitted. Also, the registers include a number of control registers 54 which define various control parameters which may control the processing of instructions by the processing pipeline. For example, the control registers 54 may include mode indicating values which specify the current mode of operation of the system, control registers for defining whether certain optional architectural features are implemented or not, and condition status flags which are set in response to outcomes of processing operations and may be tested by conditional instructions to determine whether to perform a conditional operation.

While a variety of information will be stored in the control registers 54, one particular item of control state may be a capability/non-capability mode indication 56 which specifies whether the processing pipeline is currently operating in a capability mode or a non-capability mode. The capability mode is supported by a number of architectural features which allow accesses to memory (either for data accesses in response to load/store instructions or for instruction accesses initiated by the fetch stage 6) to be subject to additional security checks based on constraints specified in association with a pointer used to access the memory.

When in the capability mode, the processing pipeline can access a set of capability registers 60 (shown in more detail in FIG. 2) which store capabilities, where a capability comprises a pointer 62 which can be used to form addresses for data or instruction memory accesses, and a set of associated constraint metadata 64 which limits the valid usage of the pointer 62 that is permitted. The capability registers 60 include a set of general purpose capability registers 66 which can generally be referenced by instructions processed by the pipeline in capability mode, either acting as a source register or a destination register for a processing operation. Also, the capability registers 60 include some special purpose capability registers including a program counter capability (PCC) register 68 and a default data capability (DDC) register 70. The PCC register 68 provides in its pointer field a program counter value 72 which in capability mode represents the instruction address of the current point of execution reached by the pipeline. The associated constraint metadata 64 can be used to check whether instruction fetches from the address derived from the program counter are allowed to proceed (or whether updates to the PCC 68 following a branch or other program flow altering operation are permitted). The DDC register 70 defines constraint metadata 64 which can be imposed on memory accesses performed in response to non-capability memory access instructions which do not directly identify that they are to use capabilities, but rather reference the integer registers 50 for forming their address operands. This can be useful for allowing legacy code written for a system which did not support the capability mode to have the memory accesses triggered by the legacy code protected by the capability mechanism provided.

For each of the capabilities in the respective capability registers 60, the constraint metadata 64 may specify bounds information 74 and permissions 76. As shown in FIG. 1, capability checking circuitry 80 is provided to check the bounds information 74 and permissions 76 of a capability for determining whether an associated operation performed with reference to the capability is allowed or should be rejected.

The bounds information 74 defines an allowable range for bounds checking of the pointer 62 in the corresponding capability. The bounds information 74 may specify a base address defining the lower bound of the allowable range for the pointer 62 and an upper limit address specifying the upper bound for the allowable range for the pointer 62. In some implementations, the bounds information 74 may be compressed, so that rather than explicitly identifying the base address and upper limit address as a full address with the same number of bits as the pointer itself, the bounds 74 may be stored in an encoded form which requires fewer bits. For example, each of the upper and lower bounds could be represented in a floating-point-like format using a bounds value indicating the significant bits of the upper or lower bound address and an exponent which indicates a number of bits by which the bounds value should be shifted to give the actual lower/upper limit address (the upper and lower bounds could both share the same exponent value). While this may reduce the precision available for defining the allowable range, by compressing the bounds information this greatly reduces the storage overhead of the capability registers, otherwise storing upper and lower bound addresses in full address form in addition to the pointer itself could lead to the capability registers being at least three times the size of an integer register storing an address. An example of an encoding scheme which can be used for the bounds information is described in Woodruff et al, "CHERI Concentrate: Practical Compressed Capabilities", IEEE Transactions on Computers 68.10 (2019): 1455-1469. However, it will be appreciated that other encoding schemes could also be used.

The permissions 76 of a given capability define whether one or more types of access right are granted for the use of the corresponding pointer 62. For example the permissions may indicate whether a read permission is granted to provide permission to use the pointer of the capability for controlling a read (load) data access, whether a write permission is granted to provide permission to use the pointer of the capability for controlling a write (store) data access, and whether execute permission is granted providing permission to use the pointer 62 of the capability for determining a branch target address or for controlling fetching of an instruction for execution. In one example, separate permission flags may indicate whether each type of permission is granted or prohibited. Alternatively, a combined encoding of the permissions field 76 may be provided which selects one of a number of permission states with each permission state corresponding to a different combination of whether the read, write and/or execute permissions is granted. Hence it is not essential to provide a separate flag for each type of permission and instead a common state value could indicate which combination of permissions is allowed or not allowed for use of the corresponding pointer 62.

Hence, by defining the constraint metadata 64 associated with a given pointer 62, an attempt to fetch an instruction from an address defined using the pointer, or an attempt to carry out a data access based on an address derived from a specified capability register, can be checked by the capability checking circuitry 80 against the corresponding constraint metadata 64 to check whether the memory access is allowed. If the bounds 74 are stored in compressed form then such checks may need the stored bounds values to be uncompressed to allow comparison of the pointer 62 against the bounds 74. Hence, if there is an attempt to perform an instruction fetch based on the PCC 68, but the program counter value is outside the valid bounds 74 specified by the PCC or the permissions 76 indicate that there is no execute permission for use of that program counter value, then a fault may be triggered. Also, if there is a load/store instruction executed which specifies its address using a reference to a particular capability register then if the instruction is a load instruction and there is no read permission indicated by the permissions 76 or the instruction is a store instruction and there is no write permission, then a fault may be generated, and also a fault may be generated if the pointer 62 (or the address calculated relative to the pointer) lies outside the valid bounds 74 of the capability.

Unlike the definition of access permissions in the MMU 28, which is typically defined coarsely per process, the use of capabilities enables more fine-grained control over access to memory because the program instruction which specifies a particular capability register thus provides an indication of the intention of that instruction, in the sense that it is intended to access a limited region of memory within certain bounds and certain limits on what use of that region is permitted. A different instruction at a different part of the program code for a given software process may specify a different capability register and thus be subject to a different set of permissions without that portion of code needing to be separated into a different software process (as may be needed for cases where the different levels of access control is to be controlled solely using an MMU 28). This capability approach makes it much simpler to partition access rights for different sandboxed components within a software process. This can help to improve security and avoid attackers being able to exploit certain memory related usage errors which may otherwise allow access to data that should not be accessed.

As well as checking capability permissions or bounds at the time of accessing memory, it is also possible for certain instructions to check the constraint metadata of the capability at other times. For example some instructions which set the pointer 62 of a given capability register could trigger a check of whether the pointer is within the corresponding bounds 74, although this is not essential (as if a check is performed when the pointer is subsequently used to control a memory access then this check on setting the pointer may be redundant).

The apparatus may have a mechanism for checking whether a capability has been validly constructed. For example, although not shown in FIG. 2, at least when stored in memory, validly created capabilities may specify a tag value which distinguishes that the data stored at that memory location represents a capability, not non-capability data. When a capability is stored in capability registers 60, its tag may also be stored in the registers 60. The tag value may be set when a valid capability is created.

It will be appreciated that FIGS. 1 and 2 shows an architectural view of the registers which are available for access by instructions processed by the pipeline 4. However, the physical registers implemented in hardware to provide the data values associated with these architectural registers could differ from the layout shown in FIG. 2. For example in an out-of-order processor the register file 14 may have a greater number of physical registers than the number of architectural registers specified in a given one of the integer register set 50, capability register set 60 or floating point register set 52, and register renaming may be used to map the architectural register specifiers to the physical registers provided in hardware.

Also, while from an architectural point of view the capability registers 60 are shown as separate from the integers 50, in some hardware implementations the pointer field 62 of some of the capability registers 60 may actually share the same hardware storage elements with corresponding integer registers 50. For example, the program counter pointer field 72 of the PCC register 68 in capability mode may be reused to provide an integer program counter in non-capability mode, where the integer program counter indicates the address of the instruction representing the current point of execution reached in non-capability mode.

During non-capability mode the constraint fields 74, 76 of the PCC 68 could be ignored. Similarly, general purpose capability registers 60 could be superimposed with general purpose registers 50.

Although a common use of capabilities is to impose bounds or permissions to constrain valid use of pointers, capabilities can also be used for other purposes. For example, some capabilities may be "sealed" capabilities which include an object type field (not shown in FIG. 2) which stores a data value representing a token which grants permission to carry out some action. A given software compartment can be granted the permission by making accessible to that software compartment the relevant capability which has the object type field set to the token value. To support such use cases, the various permission bits 76 may include a permission indicator indicating whether or not a capability can act as a sealing capability, which is permitted to seal other capabilities. Capabilities may be provided with a status indication (not shown in FIG. 2) which indicates whether they are unsealed capabilities (for which the parameters of the capability are allowed to be updated) or sealed capabilities (for which parameters of the capability are constrained to retain their current value, and which cannot be directly used (dereferenced)). Sealing of capabilities can protect against the token represented in the object type field being modified. The sealing capability which gives permission to seal other capabilities may specify in its pointer field 62 the value of the token to be written to the object type field in the target capability being sealed by the sealing operation controlled using the sealing capability, and the bounds 74 of the sealing capability may constrain the range of token values which are allowed for capabilities sealed using that sealing capability. When a sealing operation is performed (which may be triggered by a capability sealing instruction), the capability checking circuitry may check whether the software compartment requesting the sealing operation has referenced a valid sealing capability which has the permission indicator 76 set to indicate permission to seal other capabilities, and if so, whether the value in the pointer field 62 of the sealing capability is within the bounds specified in the bounds field 74, and if both conditions are satisfied then the value in the pointer field 62 of the sealing capability may be written to the object type field of the target capability to be sealed, and the target capability may have its sealing status updated to indicate a sealed capability to prevent subsequent modification of the pointer field 62. Capability load/store instructions may be used to transfer capabilities between the capability register 60 and memory 34 and so the sealed capability acting as a token can then freely be written to a region of an address space which is accessible to a software compartment to which the token is to be passed, thereby granting that software compartment permission to carry out whatever action is represented by the token by referencing that token.

Hence it will be appreciated that although subsequent discussion of capabilities refers to pointers, it is not essential for the pointer field 62 to only be used for indicating address pointers, as the sealing capability for example may reuse the pointer field 62 to represent the token value to be applied to a capability being sealed.

The processing circuitry may have a mechanism for ensuring that information defined in a capability is unforgeable. For example, there may be architectural rules for capability use to ensure that valid capabilities can only be constructed by instructions that do so explicitly from other capabilities (and not created by error or by byte manipulation, for example), and to ensure that (except in certain circumstances such as sealed capability manipulation and exception raising), when an instruction constructs a new capability it cannot exceed the permissions and bounds of the capability from which it is derived. Further information on such architectural rules can be found in Watson et al, "An Introduction to CHERI", September 2019, UNAM-CL-TR-941, section 2.3.

The processing circuitry may execute various software processes. Different processes may be assigned different address translation contexts associated with respective sets of page tables, so that one process may have a different set of page table entries used to control access to memory by the MMU 28 compared to another process. However, different portions within the same process would generally share the same set of page tables and so the page tables used by the MMU 28 may be inefficient for enforcing spatial safety by compartmentalising the process and splitting it into multiple compartments possibly with different access rights and which may potentially be mutually distrusting. For example, an internet browser could have a number of separate browser tabs and it may be desirable for the different tabs to run as separate software compartments which may have different access rights to memory and may not trust each other. The capabilities provided by the capability register 60 can be useful for providing this spatial separation between the compartments since one compartment may be provided with access to capabilities not accessible to another compartment.

The compartments might need to communicate with each other, for example through a synchronous or asynchronous request. As part of the communication, a compartment might need to temporarily share parts of memory it has access to, with another compartment. While it is relatively straightforward to give another compartment a permanent access to the address range by giving it a capability for example, sharing the address range temporarily is a problem that is not yet solved. This is because when a compartment is given a capability, that compartment may store the capability from the capability register 60 to an arbitrarily selected location in memory selected by the compartment, from which that capability could later be loaded back into the capability register 60, so the calling compartment which wishes to temporarily grant access to a range in memory could not guarantee that, by clearing the capability from capability registers 60 or its controlled locations in memory, other compartments may no longer be able to access memory using that revoked capability. An option may be to scrub the entire address space to check whether it stores any copies of the capability to be revoked, but that is extremely inefficient in terms of processing time and may greatly delay other operations. Hence, it may be useful to provide a non-probabilistic mechanism for achieving temporal safety while sharing memory regions between compartments.

As shown in FIGS. 1 and 2, the apparatus 2 may have key capability storage circuitry 90 for storing key capabilities. In the example of FIGS. 1 and 2 the key capability storage is implemented as further registers, provided in addition to the capability registers 60. However, other examples may implement the key capability storage 90 as a region in memory 34, rather than as architecturally visible registers.

The key capability storage circuitry 90 may store one or more key capabilities, which are similar to capabilities in the capability register 60 in that they specify key bounds information 94 and key permissions 96 which are analogous to the bounds information 74 and permission 76 of the capabilities in the capability register 60. The key bounds and key permissions 96 may be used for checks on operations performed by the processing circuitry, in a similar way to the way in which capabilities can be used to constrain the operations performed by the processing circuitry. The key capability checks, performed by capability checking circuitry 80 based on the bounds and permissions 74, 76 defined in the key capability storage 90, may be combined with the regular capability checks using the bounds 74 in the capability register 60, so that in at least one mode of operation, operations requested by the processing circuitry may be permitted only if they satisfy both the checks based on key bounds 94 and the capability bounds 74.

However, interaction with the key capability storage 90, and the creation and transfer of key capabilities between the key capability storage 90 and the capability registers 60 or the memory 34 may be more restricted in comparison to the ability to create capabilities in the capability registers 60 or transfer the normal capabilities between capability registers 60 and memory 34. Software compartments may be assigned a key capability operating privilege which is associated with at least a portion of the key capability storage circuitry 90. In some examples the key capability operating privilege may be assigned to a software compartment as a whole regarding the whole capacity of the key capability storage 90, while in other examples it may be possible to designate separate key capability operating privileges for different parts of the key capability storage. A software compartment which lacks the key capability operating privilege may not be allowed to create new key capabilities. Also, the software compartment lacking the key capability operating privilege may not be allowed to cause the processing circuitry to transfer key capabilities between the key capability storage 90 and the capability register 60. Also, the software compartment lacking the key capability operating privilege may not be allowed to cause the transfer of a key capability between the key capability storage 90 and an arbitrarily selected location in memory 34 that is selected by the software compartment lacking the key capability operating privilege (the transfer prohibited for the compartment without the key capability operating privilege could be key capability loads only, key capability stores only, or could be both key capability loads and key capability stores, where key capability loads are transfers from memory (including the caches) to registers and key capability stores are transfers from registers to memory).

These restrictions allow a software compartment having the key capability operating privilege to create a key capability which represents a temporary permission to access some region of memory or carry out some other action, and then the software compartment having the operating privilege may set up a capability in the regular capability register 60 to be passed to the compartment not having the key capability operating privilege, to grant action permission for whatever action is to be performed by the called compartment. At the point when the permission to perform the action is to be revoked, the key capability 90 can be revoked, and this may effectively mean that the corresponding rights granted by capabilities in the capability register 60 or a capability stored in memory 34 may no longer be effective as the capability checking circuitry 80 may perform combined capability/key capability checking to check actions to be performed against both the bounds defined in the capability register 60 and the bounds defined in the key capability register 90. As the software compartment which did not have the key capability operating privilege was not able to transfer key capabilities out to memory 34, then this means that on revoking the key capability there is no need to scrub memory to find copies of the revoked key capability that should no longer be accessible, and so this deals with the temporal safety problem discussed earlier.

Other examples may not restrict the storage of key capabilities from the key capability register to memory 34, but could instead restrict the loading of a key capability from memory into the key capability register by a software compartment not having the key capability operating privilege. By restricting the transfer of key capabilities back into the key capability register 90 this could avoid key capabilities previously saved to memory being reused after they have been revoked, which is sufficient to provide the temporal safety even if it is allowed to store key capabilities from the key capability storage 90 to memory without the key capability operating privilege.

As shown in FIG. 2, it is not essential for the key capabilities to be defined in the same format as the capabilities provided in the capability register 60. For example, as the key capabilities may define additional permissions and bounds to be applied in combination with any permission and bounds defined in capability registers 60 when checking information specified in the pointer field 62 of a capability or the general purpose registers 50 for a non-capability operand, the key capabilities themselves need not include a pointer field as indicated by the dotted lines in FIG. 2. Also, there could be differences in an encoding between the key capabilities and the regular capabilities. For example the range of permission types provided for key capabilities could be different to the types of permission indicated in field 76 for the capabilities. Also the key bounds information 94 could be represented in an uncompressed or less compressed format compared to the bounds information 74 for the capabilities.

FIGS. 3 and 4 show two examples of ways of designating particular software compartments as having or lacking the key capability operating privilege. FIG. 3 shows a first example in which the processing circuitry 4 can perform data processing in one of a number of operating states. The control register 54 may for example include mode or state indicating fields which represent the current operating state of the processing circuitry. As shown in FIG. 3, the operating state may correspond to the intersection of two different orthogonal types of state. On the one hand, at a given time the processing circuitry may be considered to operate in one of a number of exception levels, for example one of a user exception level EL0, a kernel exception level EL1 or a hypervisor exception level EL2. The exceptions levels EL0, EL1, EL2 may be associated with increasing levels of system privilege so that when in the hypervisor exception level EL2 the processing circuitry 4 has right to carry out some actions which are not possible in exception levels of lower system privilege. For example the exception level may control which types of instructions can be executed or which registers 14 are accessible to software executing in that exception level. Transitions between exception levels may occur when taking an exception or returning from processing of an exception.

Orthogonal to the exception levels, there may also be an indication of whether the processing circuitry 4 is operating in a restricted state or an executive state. Hence there may be restricted and executive versions of each of the exception levels EL0, EL1, EL2. When the processing circuitry is in the executive state then the executing software compartment may be considered to have the key capability operating privilege so that various key capability manipulating instructions for creating, modifying or causing transfers of key capabilities to or from memory may be allowed to be executed. When the processing circuitry is in the restricted state then such key capability manipulating instructions may not be allowed to be executed. It will be appreciated that FIG. 3 does not show all the possible operating states in which the processing circuitry 4 can execute, and there could be further exception levels or states not shown in FIG. 3.

FIG. 4 shows another example of designating key capability operating privileges. In this example it is possible to designate separate key capability operating privileges for different portions of the key capability storage 90. For example, a table 100 may be provided with a number of entries each corresponding to one of the key capability registers or to a block of several key capability registers, depending on implementation. Each entry may define range information which indicates a range of instruction addresses associated with having the key capability operating privilege for manipulating key capabilities associated with the corresponding register or registers of the key capability storage 90. Alternatively if the key capability storage 90 is implemented as a region of memory 34 then each entry of the table 100 could correspond to a sub-region of that block of memory used to represent the key capability storage. Each entry of the table 100 may specify a start address and either a length (size) parameter or an end address parameter. The start address and size/end address indicate the limits of a corresponding range of addresses defined as having the key capability operating privilege. Hence, when executing instructions, if the instruction address of a key capability manipulating instruction is within the range indicated as having the key capability operating privilege for a given part of the key capability storage, then that instruction is allowed to execute to carry out the corresponding manipulation of the relevant key capability. Instructions not within the range indicated for a given portion of the key capability storage may not be allowed to carry out such manipulations. While FIG. 4 shows a case with per-sub-region setting of the key capability operating privilege, such a range based definition of software that has the key capability operating privilege could also be used in the implementation where the key capability operating privilege is assigned for the key capability storage as a whole.

FIG. 5 shows an example of indicating portions of the key capability storage 90 as active portions of 98 or inactive portions 99. For example, boundary information 102 could be set to mark a boundary between the active and inactive portions 98, 99. Key capabilities in inactive portions 99 of the key capability storage 90 may not be allowed to be used to confer permission to carry out a relevant action. Hence during key capability checks the capability checking circuitry 80 may ignore any bounds or permissions specified in key capability stored within inactive regions 90, and may only permit actions which are validated by the key bounds 94 or key permissions 96 within a key capability that is valid within the active region 98. This is useful to allow a controlling software compartment to temporarily prevent a given key capability from being used to confer permission by moving the boundary so that that key capability is now in an inactive region 99, without having to invalidate the key capability completely, so that is more efficient to later re-enable use of that key capability by moving the boundary once more. While FIG. 5 shows the use of boundary information 102 to set the active or/and inactive portions of the key capability storage 90, other examples could represent the active and inactive regions in a different way, e.g. using active/inactive indicators associated with each portion of the key capability storage 90.

Modification of the boundary information 102 can be performed in response to a boundary information modifying instruction executed by a software compartment having the key capability operating privilege. For example, the boundary information 102 could be defined in a location (e.g. software-accessible register or a memory system location) for which access is restricted to software compartments having the key capability operating privilege.

Figure 6:
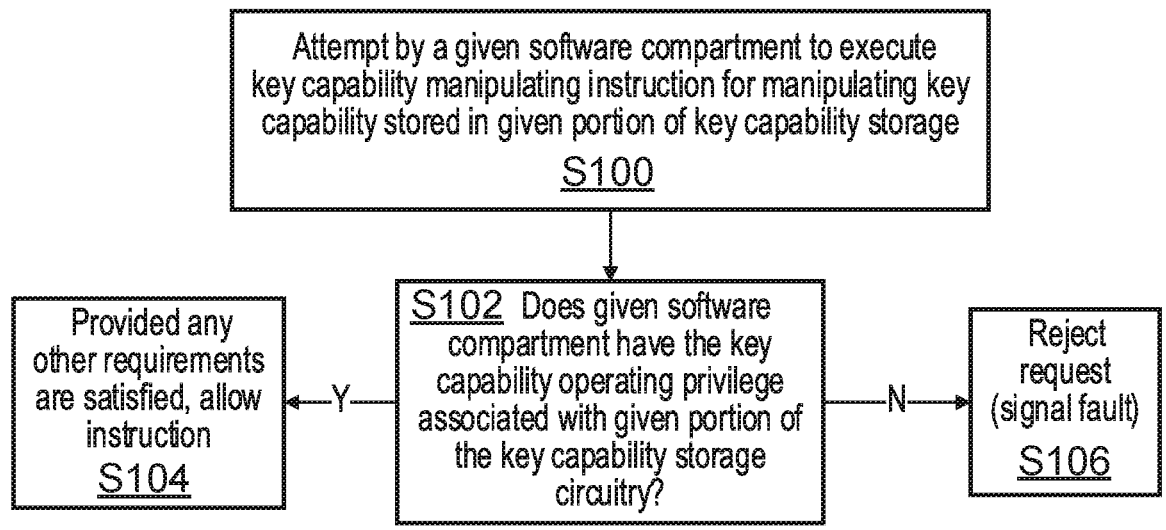
FIG. 6 is a flow diagram showing a method of processing a key capability manipulating instruction.

FIG. 6 is a flow diagram showing a method of processing a key capability manipulating instruction. At step S100 an attempt is made by a given software compartment executing on the processing pipeline 4 to execute a key capability manipulating instruction for manipulating a key capability stored in a given portion of the key capability storage 90. For example the manipulating instruction could be requesting creation of a new key capability in the given portion of the key capability storage. Also the manipulating instruction could be requesting a modification to the key capability in the given portion of the key capability storage. Another type of manipulating instruction could request that a key capability is written to memory 34 from the key capability storage 90 or that the given portion of the key capability storage 90 is loaded with a key capability read from memory 34.

In response to the given software compartment, the processing circuitry 4 determines at step S102 whether the given software compartment has the key capability operating privilege associated with the given portion of the key capability storage circuitry. For example this could include determining whether the current operating state is the executive state, or determining whether the instruction address of the key capability manipulating instruction falls within the range indicated by the range information table 100 as having the key capability operating privilege for the given portion of the key capability storage circuitry. If the given software compartment has the key capability operating privilege, then at step S104 the instruction is allowed, provided any other requirements are satisfied. For example, these other requirements could include whether or not the exception level is of sufficient privilege to execute the key capability manipulating instruction, or whether the address specified by the key capability manipulating instruction for a transfer of a key capability to or from memory is permitted to be accessed by the current software process, as determined based on page table information checked by the MMU 28 or other protection information.

If at step S102 the given software compartment does not have the key capability operating privilege then at step S106 the request made by the key capability manipulating instruction is rejected. For example a fault may be signalled. This prevents inappropriate software establishing or manipulating key capabilities that could give it inappropriate access rights to access memory.

It is noted that there may be corresponding capability manipulating instructions for manipulating capabilities which are stored in the capability register 60. A software compartment which does not have the key capability operating privilege may still be able to execute such capability manipulating instructions, in contrast to the key capability manipulating instructions, provided any other requirements checked at step S104 (e.g. sufficient exception level to execute the capability manipulating instruction) are satisfied. Hence, for capability manipulating instructions which are aimed at manipulating regular capabilities, permission to act on such instructions may not depend on whether the software compartment requesting the manipulation has the key capability operating privilege.

Figure 7:
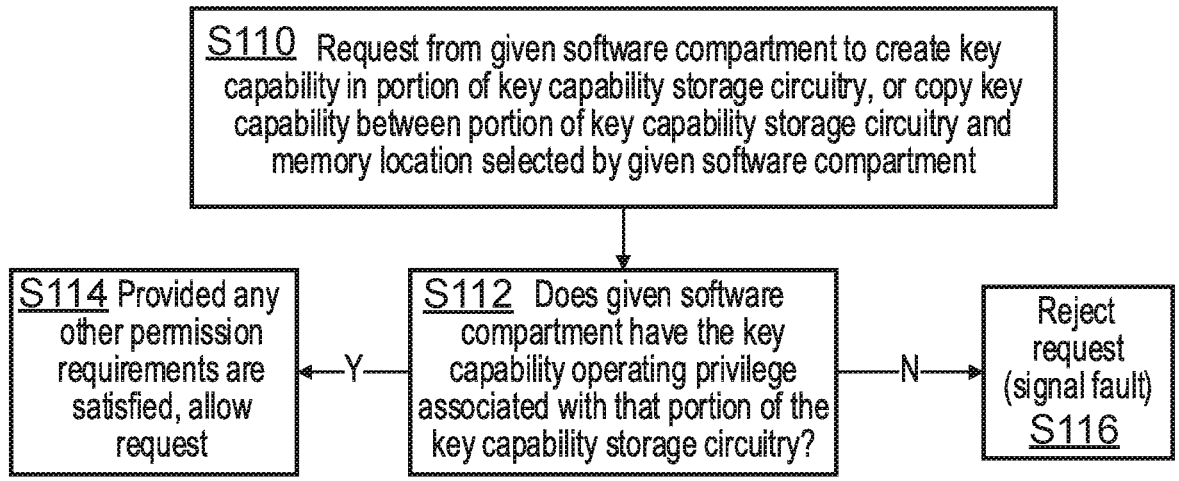
FIG. 7 is a flow diagram showing a method of controlling creation or transfer of key capabilities based on whether the requesting software compartment has the key capability operating privilege.

FIG. 7 illustrates in more detail specific types of manipulations that may be controlled based on the key capability operating privilege. FIG. 7 is similar to FIG. 6 but at step S110 a request is made by the given software compartment to either create a key capability in a portion of the key capability storage circuitry or copy a key capability between a given portion of the key capability storage circuitry 90 and a memory location selected by the given software compartment. The memory location selected by the given compartment is identified by a memory address and the data corresponding to that address could be physically stored within a cache 30, 32 or within main system memory 34. Similar to FIG. 6, at step S112 it is checked whether the given software compartment has the key capability operating privilege and if so then the request can in principle be allowed, provided other permission requirements are satisfied as stated at step S114, or if the software compartment does not have the key capability operating privilege then at step S116 the request may be rejected and a fault may be signalled.

Figure 8:
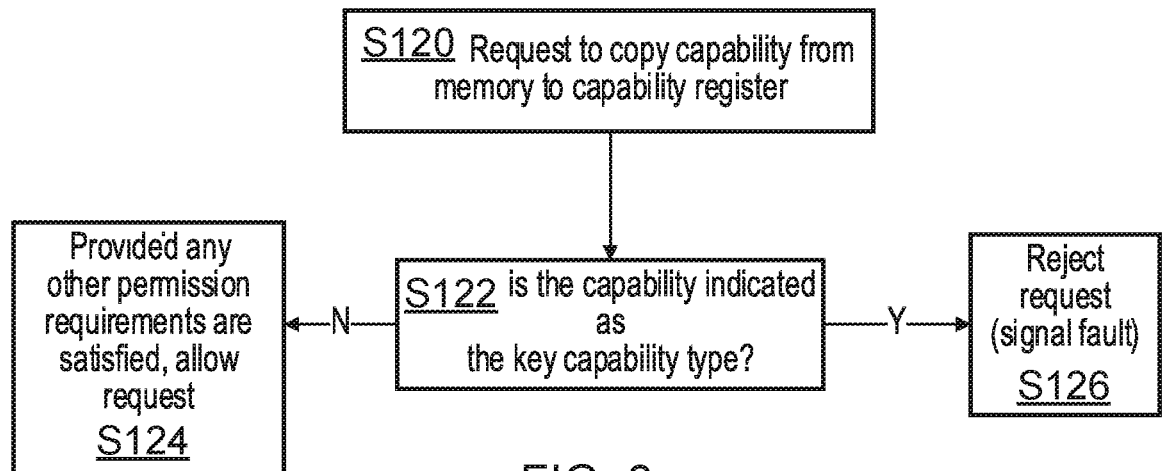
FIG. 8 illustrates control over whether loading of a capability from memory to a capability register is allowed based on whether the capability is indicated as a key-capability-type.

In some examples, capabilities may be defined with a capability type indicator which may indicate the type of capability. In some examples, it is possible to assign key capabilities with a dedicated key-capability-type. This can be helpful to allow capabilities in memory to be distinguished as key capabilities or regular capabilities. It may be desirable to prevent information derived from key capabilities being loaded into capability registers 60. Hence, as shown in FIG. 8, at step S120 when the processing circuitry 4 makes a request, in response to a relevant software instruction, to copy a capability from memory 34 to the capability register 60 then at step S122 the processing circuitry 4 or the capability checking circuitry 80 checks whether the capability is indicated as the key-capability-type. If the capability is not of the key-capability-type, then at step S124 the request can in principle be allowed, although whether it is actually allowed may depend on whether any other permission requirements (e.g. memory permissions checks, capability bounds checks) are satisfied. If the capability is indicated as the key-capability-type then at step S126 the request is rejected and a fault may be signalled. This prevents bounds defined in a key capability straying into the capability registers. If the capability desired to be copied to the capability register 60 is not the key-capability-type then the copying of the capability may in principle be allowed, provided any other permission requirements are satisfied, such as checks performed by the MMU 28 or capability checks 80 checked based on the bounds 74 and permission 76 of a capability in the capability register 60 being used to control the copying of the target capability from memory to the capability register 60.

Figure 9:
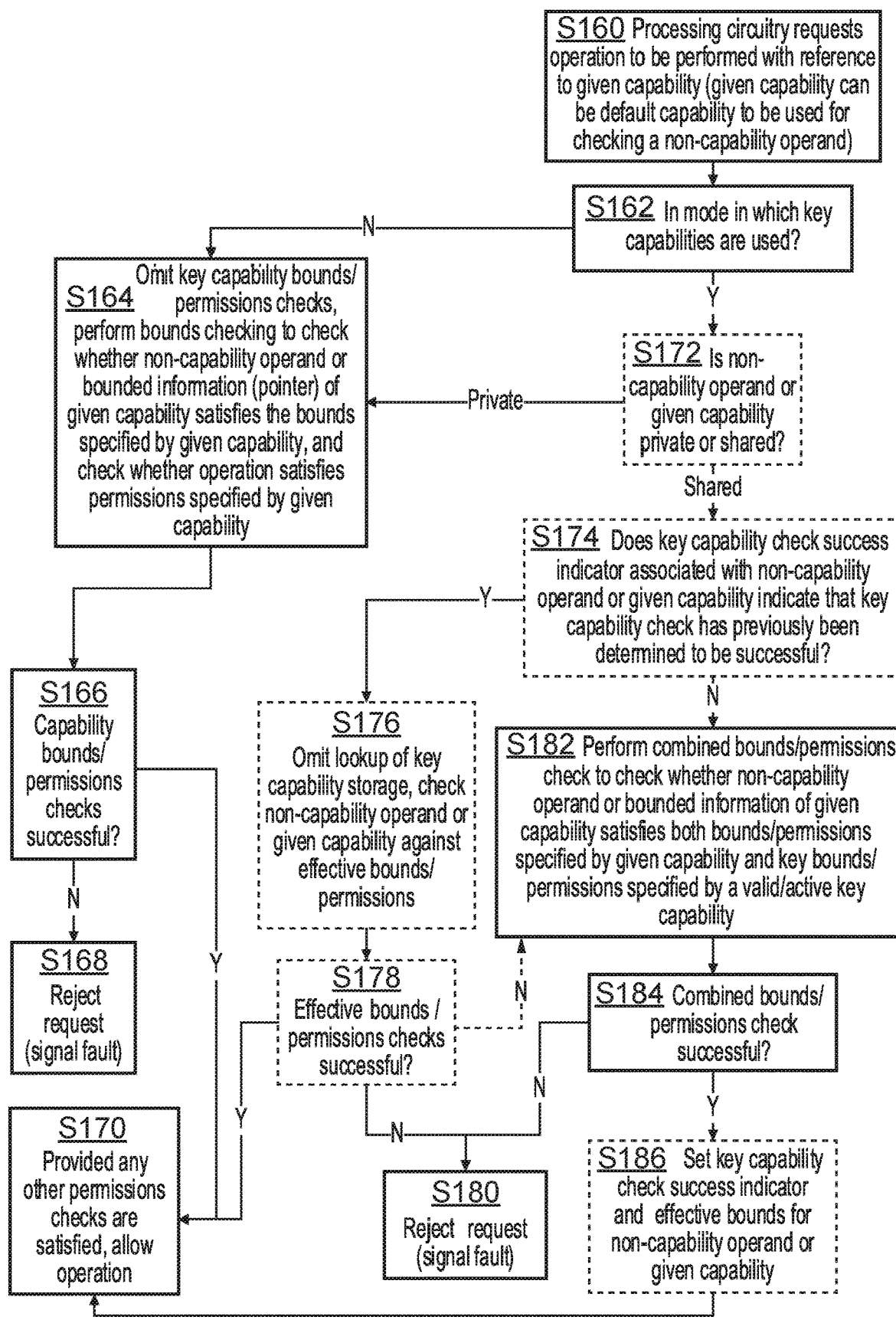
FIG. 9 is a flow diagram illustrating an example of capability checking for determining whether an operation is allowed based on bounds checking.

FIG. 9 illustrates capability and key capability checking performed by the capability checking circuitry 80. At step S160 the processing circuitry 4, in response to an instruction decoded by decode stage 10, requests an operation to be performed with reference to a given capability. The given capability could be the default capability 70 in the case where the instruction is requesting an operation to be performed with respect to an non-capability operand (e.g. an operand in the general purpose registers 50), or could be one of the general purpose capabilities stored in the capability registers 60, if the operation is performed in response to an instruction explicitly referencing one of those registers.

At step S162 the capability checking circuitry 80 determines whether the processing circuitry 4 is operating in a mode in which key capabilities are to be used. In some implementations the processing circuitry may support some modes in which the key capabilities are not used, for example to save power by avoiding the key capability checks in cases where the capabilities themselves provide sufficient protection. If key capabilities are not to be used then at step S164 any key capability bounds checks are omitted and the capability checking circuitry 80 performs bounds checking to check whether the non-capability operand or the bounded information (e.g. pointer) 62 of the given capability satisfies the bounds specified by the bounds information 74 in the given capability, and also checks whether the operation satisfies any permission 76 set for the given capability. At step S166 the capability checking circuitry 80 determines whether any capability bounds/permissions checks were successful and if not then at step S168 the request to perform the operation is rejected and a fault may be signalled. For example, this could be because the operation requested was an access to memory to an address which was not within the relevant bounds 74 specified by the given capability, or was of an operation type which is not allowed by the permission 76 (e.g. a write when the capability specifies read-only permission). On the other hand, if the capability bounds and permissions checks are successful then at step S170 the operation can be allowed, provided any other permissions checks are satisfied. For example, there may also be orthogonal checks performed using page tables or other protection information by the MMU 28, and so even if the operation could in principle be allowed based on the capability checks, it is not guaranteed that the operation is also allowed by other checks.

Figure 10:
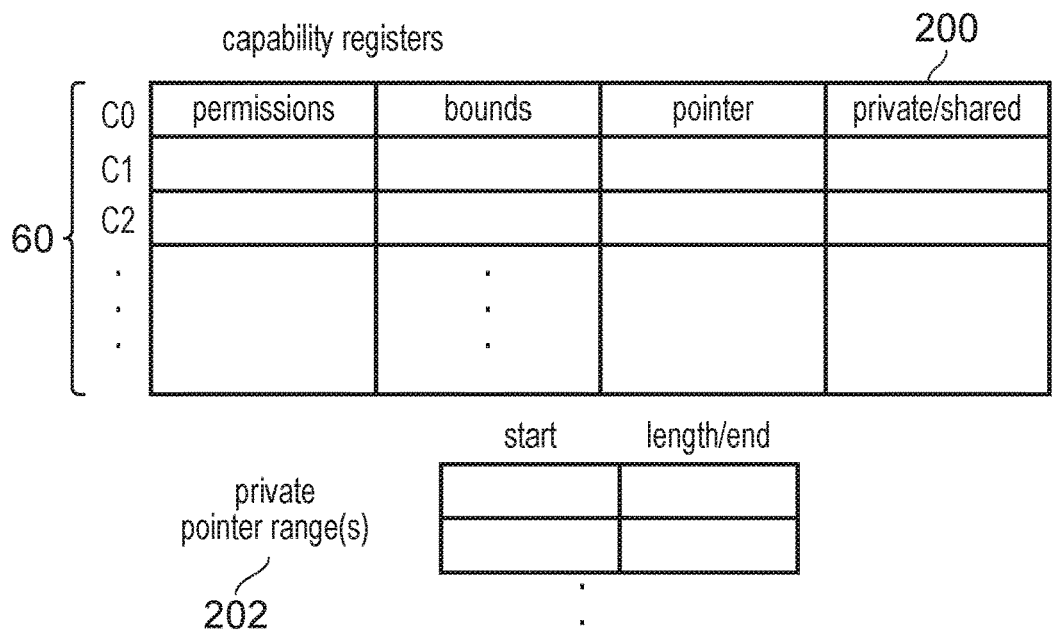
FIG. 10 illustrates an example of private/shared information indicating whether a capability or non-capability operand is private or shared.

If at step S162 it is determined that key capabilities can be used in the current mode then the method may proceed to step S172 where in some implementations a check may be made as to whether the non-capability operand to be checked using the default capability 70, or the given capability in the case where the operation is to be checked with reference to a general purpose capability in the capability registers 60, is private or shared. FIG. 10 shows an example of indicating private or shared operands or capabilities. For example, each capability register 60 may comprise a private/shared field 200 which indicates whether the corresponding capability is private or shared. When capabilities are written to memory, the private/shared field 200 may also be included so that when capabilities are subsequently loaded back from memory then they retain their status unless there is a need to change the status as a consequence of the transfer between memory and registers as explained further with reference to FIG. 13 below. Similarly, non-capability operands could be marked as private or shared by defining private pointer range information 202 which may specify one or more ranges, each range defined by a start address and a length or end address, which indicate the ranges of the address space for which pointers or other non-capability operands falling within that range can be regarded as private. Alternatively other approaches could use shared pointer range information to define the range of pointer values to be regarded as shared. It will be appreciated that there could also be other ways of marking non-capability operands as shared or private, such as by adding extra fields to the general purpose registers 50 similar to the private/shared field 200 shown for capability register 60.

Providing the ability for capabilities or non-capability operands to be marked as private can be useful because for capabilities/operands which will only be used within a given software compartment and will not be shared with other compartments, there may be no need to perform key capability checks and so by omitting key capability bounds checks for private capabilities or private non-capability operands, this can save power. Hence, if at step S172 the non-capability operand or the given capability is determined, based on the private/shared status information 200, 202, to be a private operand or capability, then the method continues to step S164 and proceeds as described earlier to perform the capability bounds or permissions checks, but any key capability bounds or permissions checks are omitted. If the non-capability operand or the given capability is determined to be shared then the method continues to step S174, as key capability checks could be required.

It will be appreciated that the support for private and shared capabilities or non-capability operands is not essential and some implementations may not distinguish private and shared capabilities. In that case, step S172 could be omitted and when in a mode in which key capabilities are to be used, the method of FIG. 9 may proceed straight from step S162 to step S174.

Figure 11:
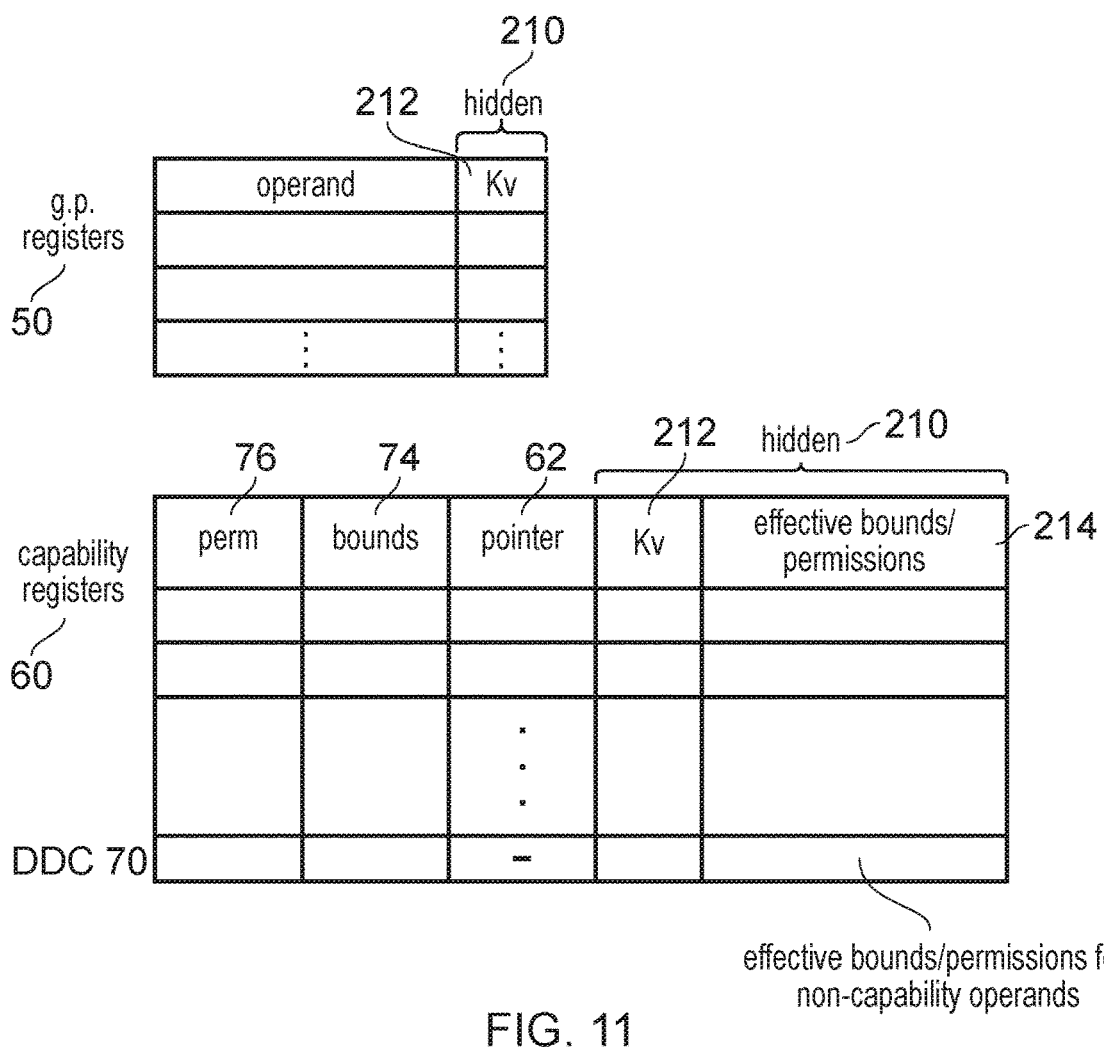
FIG. 11 illustrates use of a key capability check success indicator.

At step S174, the capability checking circuitry 80 may perform a check of a key capability check success indicator associated with the non-capability operand or the given capability, to check whether it indicates that the key capability check has previously been determined to be successful. As shown in FIG. 11, general purpose registers 50 providing non-capability operands and capability registers 60 providing capability operands may be extended with an architecturally hidden portion 210 which is not visible to software but can be read and written by the hardware circuit logic of the capability checking circuitry 80. The hidden portion may include a key check success indicator 212. Also, the hidden portion for the capability registers (including the default capability register 70 to be used for checking of non-capability operands) may include effective bounds/permissions information 214. On a successful key capability check for a given non-capability operand in general purpose register 50 or capability operand in capability register 60, the key capability success indicator (Kv or key check valid indicator) 212 may be set to a given value, e.g. 1, which indicates that on subsequent uses of the same operand the key capability checks do not need to be repeated, provided that the operation requested is within the effective bounds and permissions indicated in field 214. The effective bounds and permissions 214 may be set in response to a successful key capability check to correspond to the intersection of any bounds or permissions set by the relevant key capability in fields 94, 96 and any bounds or permissions 74, 76 specified by a corresponding capability or default capability. This protects against the fact that although a key capability check may have been successful on one occasion, if the non-capability operand or pointer 62 of the relevant capability later changes then it might no longer be within the key bounds 94 of the previously checked key capability (even if still within bounds 74 permitted by the regular capability) so by storing the effective bounds/permissions corresponding to the combination of key capability/normal capability bounds/permissions, this can avoid the capability checking circuitry 80 needing to look up the key capability registers 90 again, while still enforcing the appropriate bounds/permissions. This approach can be useful to save power by avoiding repeating operations whose outcome is already known from previous checks. In some examples, the "key capability check success indicator" 212 could be seen as an indication of whether the effective bounds/permissions field 214 is valid.

Hence, if at step S174 the key capability check success indicator 212 associated with the relevant non-capability operand or given capability indicates that the key capability check has previously been determined to be successful (or, equivalently, that an effective bounds/permissions valid field 212 indicates that effective bounds/permissions 214 are valid), then at step S176 lookup of the key capability storage 90 can be omitted and instead a check can be made of the non-capability operand or the given capability's pointer value 62 against the effective bounds or permissions 214 set for the default capability 70 used to check the relevant non-capability operand or the given capability. If at step S178 it is determined that these effective bounds and permissions checks are successful then again at step S170, provided any other permissions checks are satisfied, the operation can be allowed, while if the effective bounds and permissions checks are unsuccessful then at step S180 the request may be rejected and a fault may be signalled.

On the other hand, if at step S174 it was determined that the key capability check success indicator 212 did not indicate that it is known that a key capability check has previously been determined to be successful for the relevant non-capability operand or given capability (or did not indicate valid effective bounds/permissions 214), then the method proceeds to step S182 to perform combined bounds and permissions checking based on both capabilities and key capabilities.

At step S182 a combined bounds/permissions check is performed by the capability checking circuitry 80, to check whether the non-capability operand or bounded information 62 of the given capability satisfies both the bounds and the permissions specified by the given capability and the key bounds 94 and key permissions 96 specified by a valid and active key capability in the key capability storage 90. Here, key capabilities within an inactive portion 99 of the key capability storage 90 may not be used to confer permission to carry out an action. Also, the key capability storage may have valid indicators which indicates whether each part of the key capability storage stores a valid key capability and so invalid key capabilities may not confer permission to carry out an action.

At step S184 the capability checking circuitry 80 determines whether the combined bounds and permissions checks are successful. The combined checks will be unsuccessful if either the capability checking based on bounds 74 and permissions 76 of a relevant capability or the key capability checks based on the bounds 94 and the permissions 96 of a key capability is unsuccessful. If both capability and key capability checks are successful then at step S170 the operation may be allowed. In implementations which support the key capability check success indicator, the capability checking circuitry 80 in the case when checks are successful also performs step S186 to set the key capability check success indicator 212 associated with the relevant non-capability operand or the given capability to indicate a successful key capability check, and (if effective bounds/permissions field 214 is supported) also sets the effective bounds and permissions field 214 based on the logical AND combination of the key bounds and permissions 94, 96 of the matching key capability (the key capability which conferred permission to carry out the operation requested at step S160) and the capability bounds and permissions 74, 76 of the given capability. Implementations which do not support the key capability check success indicator can omit step S186.

On the other hand, if at step S184 it is determined that either the key capability bounds checks or permission checks, or the capability bounds or permissions checks, were unsuccessful then at step S180 the request is again rejected and a fault is signalled.

The dotted arrow in FIG. 9 between steps S178 and S182 shows an alternative implementation that could be used when the effective bounds/permissions checks are unsuccessful at step S178. Rather than faulting, the method may proceed to step S182 to perform the combined bounds/ permissions check using the bounds/permissions fields 74, 76 and key bounds/permissions fields 94, 96, and then the operation may either be permitted at step S170 or rejected at step S180 depending on the outcome of the combined bounds/permissions check at step S182. This option can be useful as in some scenarios it may be possible that although the requested operation may not fall within the effective bounds/permissions 214 indicated for the given capability or non-capability operand, nevertheless the operation may still satisfy both the capability bounds/permissions 74, 76 of the relevant capability, and the key bounds/permissions 94, 96 of a valid/active key capability. For example, this could occur if the effective bounds/permissions checks were previously set based on checking against a given capability and a key capability A having wide bounds but few permissions (e.g. permitting loads but not stores), and a later operation of a type not permitted by key capability A (e.g. a store) is then requested using the same given capability, so although the later operation is not permitted based on the effective permissions, it can nevertheless be permitted if there is another key capability B having narrower bounds but a wider range of permissions (e.g. permitting both loads and stores). This is just one example of intersecting permission/bounds sets for key capabilities, and others are also possible, but it illustrates that it may be useful to provide the alternative indicated by the dotted arrow between steps S178 and S182.

It will be appreciated that not all implementations need to support the key capability check success indicator and in implementations which do not support this then steps S174, S176 and S178 can be omitted and instead the method may proceed direct from step S162 to S182 or from S172 to S182 without performing step S174.

Also, some approaches could support the key capability check success indicator 212 but not the effective bounds/permissions field 214. In an implementation which does not provide the effective bounds/permissions field 214, steps S176 and S178 of FIG. 9 may be modified to check the requested operation against the bounds/permissions fields 74, 76 of the given capability, instead of based on the effective bounds/permissions field 214. Also, setting of the key capability check success indicator 212 at step S186 of FIG. 9 may depend on a check of whether the bounds/permissions defined for the given capability are entirely within the bounds/permissions defined for one or more valid and active key capabilities. If the bounds/permissions defined for the given capability are entirely within the bounds/permissions defined for one or more valid and active key capabilities, then the key capability check success indicator can be set, because a subsequent operation which passes capability checks based on the given capability will implicitly also pass key capability checks based on the one or more valid and active key capabilities (as the key capability bounds/permissions are more permissive, or equally permissive, compared to the capability bounds/permissions). In contrast, if the bounds/permissions of the given capability are more permissive than the bounds/permissions of one or more valid and active key capabilities (e.g. because the given capability allows additional action types to be permitted, has wider bounds than the key capabilities, or has bounds spanning an address range that falls in the gap between address ranges defined by bounds for two or more valid and active key capabilities), then the key capability check success indicator 212 is not set at step S186 (as even if the currently requested operation is permitted based on both capability checks and key capability checks, it cannot be guaranteed that any future operation satisfying the capability checks will also satisfy the key capability checks). Also, the capability checking circuitry 80 may clear/recompute the key capability check success indicator field when the bounds/permissions 72, 74 of the given capability is updated or when a key capability is updated, invalidated or made inactive.

Figure 12:
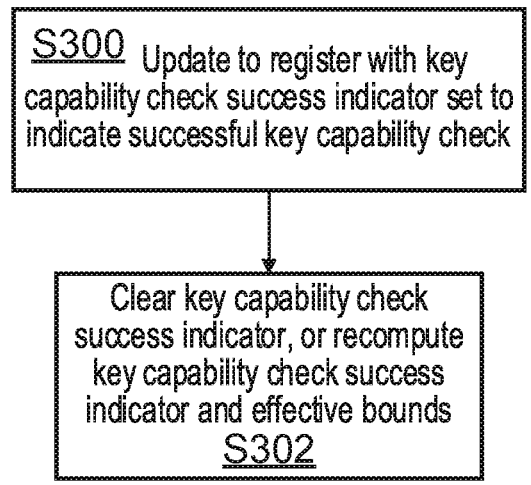
FIG. 12 is a flow diagram showing clearing or re-computing the key capability check success indicator in response to an update to a register having the key capability check success indicator set.

FIG. 12 shows a method for maintaining key capability check success indicators 212 in implementations which support this. At step S300 of FIG. 12 the processing circuitry 4, in response to decoding of a relevant instruction, updates a given register 50, 60 which has the key capability check success indicator 212 set to indicate a successful key capability check. In response to the register update, at step S302 the processing circuitry 4 or the capability checking circuitry 80 clears the key capability check success indicator, or alternatively performs a key capability check based on the updated value of the register and if this is successful re-computes the key capability check success indicator and the effective bounds 212, 214. This ensures that previously valid key capability checks are no longer automatically indicated as valid following a register update, to ensure that they key capability permissions are respected following the update. In implementations which have the effective bounds/permissions field 214, the method of FIG. 12 may be performed in response to updates to the permissions 76 and bounds 74 of the corresponding capability register, but may not be needed when the pointer 62 of that capability register or the non-capability operand in a general purpose register 50 is changed, as the new pointer/operand value could still be checked against the effective bounds/permissions field 214. In implementations which do not support the effective bounds/permission field 214, step S302 may also be performed in response to updates to the pointer field 62 or non-capability operand stored in a capability register 60 or general purpose register 50 having the key capability check success indicator set to indicate a previously successful key capability check.

Figure 13:
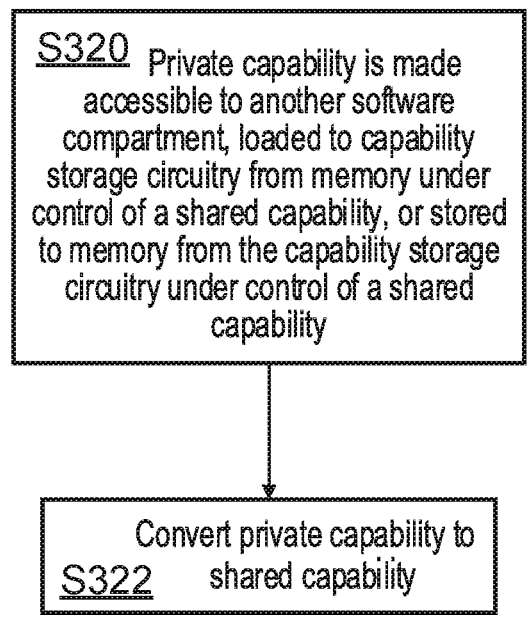
FIG. 13 illustrates converting a private capability to a shared capability.

FIG. 13 shows actions for maintaining the private/shared status 200 for capabilities or non-capability operands. At step S320 one or more instructions are executed to control the processing circuitry 4 to request that any of the following:

that a private capability (for which the private/shared information 200 specifies a capability as private) is made accessible to another software compartment, that the private capability is loaded to the capability storage 60 from memory under control of a shared capability, or that the private capability is stored to memory from the capability storage circuitry 60 under control of a shared capability.

If any of these actions occurs then at step S322 the private capability is converted to a shared capability (by updating the private/shared status indication 200 associated with the capability, which may be included within the capability information stored in memory. Some implementations may not need to convert private capabilities as shared in response to all of the actions shown at step S320, but these are all options available. By providing hardware infrastructure which may enforce the conversion of a capability from private to shared when it is potentially being shared with another software compartment, this avoids key capability checks being circumvented for capabilities intended to be used by multiple compartments.

Further specific examples are set out below. It will be appreciated that not all embodiments need to have all these features.

A "capability" is usually a pointer extended with additional information (like permissions or boundaries) and may include an additional tag bit indicating validity of the additional information. However, various capability types can, for example, not include pointer value while including something else. A feature of capabilities is that it contains some unforgeable information so that the system is able to check whether the capability was constructed in a valid way. There are many possible ways to encode/represent capabilities—which can be explicit or implicit ways of representation in the system state, or both, depending on the particular design.

A "capability type" defines a category of capabilities having common features and/or intended use-cases, independent of their representations and/or ways of encoding.

A "compartment" may in some examples (other examples may use a different definition) be a part of process owning a set of address space ranges and potentially other resources. Ownership of address space ranges may be given to a compartment through capabilities.

"Compartment privileges" may be a set of permissions of a compartment determined by capabilities, which the compartment has access to. The permissions can be given by a single capability or by combination of a capability with other capabilities represented directly or otherwise derived from the system state.

A "compartment hierarchy" may be a structure of compartments or compartment groups (types) in a particular design, where compartments have different compartments privileges and a compartment A is higher than compartment B in the structure if A's privileges are a strict superset of B's privileges.

The Executive and Restricted states referred to below are capability-related modes of execution with different levels of privilege which are orthogonal to exception levels (hypervisor/kernel/user-space). This is an example of compartment hierarchy with two compartment types.

"Generic register" refers to a generic CPU register (e.g. the general purpose registers 50 or capability registers 60 mentioned above).

A. Key Capabilities
 1. Generic description.
  a. In the examples described above, the concept of key capability storage is introduced which:
   i. comprises items able to hold key capabilities—can be a set of registers or set of memory ranges defined by current system state, or both
   ii. can be active or inactive in the current system state.
  b. Introduce KeyOperate privilege (key capability operating privilege), which confers the right to manipulate key capabilities.
  c. Some designs might introduce a key-capability-type which:
   i. can only be manipulated (constructed, moved or destroyed) within a Key capability storage unless the current compartment has KeyOperate privilege
   ii. is active when it is located in an active Key capability storage
   iii. when active, defines bounds/permissions for controlling whether operations governed by other explicit or implicit capabilities or capability types can be performed.
  d. whereas other designs might achieve similar level of functionality without introducing special key-capability-type, specifying that:
   i. key capabilities in an active Key capability storage have effect on whether certain memory accesses are allowed when matching those.
   ii. there are certain restrictions on when capabilities can be copied to the Key capability storage, invalidated or modified there
  e. The scheme can be extended by allowing the Key-Operate privilege to be granted in a finer-grained manner, e.g. for specific Key capability storage instances or parts of them. For example, the privilege can be delegated and restricted for a subset of an active Key capability storage.
 2. Example description of a particular design case, which assumes a compartment hierarchy with two compartment types—executive/restricted—where restricted compartments communicate between each other with the assistance of the executive compartment.
  a. Extend the architecture with a set of KR-registers (a version of Key capability storage 90) that can hold capabilities and aren't accessible by means of usual capability instructions
   i. the capabilities in KR-registers can be encoded in different ways and encoding for capabilities in KR-registers shouldn't necessarily be the same as for other capabilities or capabilities stored in other parts of the system; furthermore, the capabilities in KR-registers don't necessarily need to have all the fields that exist in other capabilities and might have additional fields.
  b. Introduce capability type K (a version of key-capability-type) that is created in KR-registers, can't be moved to registers other than KR, can be invalidated in KR-registers, can't be loaded from or stored to memory by a restricted compartment itself, however can be loaded/stored by the executive compartment (i.e. the executive compartment has the Key-Operate privilege).
  c. The K-capabilities are allowing to access particular memory regions using other pointers (or capabilities)
  d. Introduce additional limitation on whether an address is accessible using a pointer (or capability):
   i. a memory access is invalid if there is no K-capability in the Key capability storage that is valid and has boundaries including the target region.

The above enables introduction of temporal safety for communication between compartments. B More details on use-cases based on the particular design case described in item A.2 above, and additional changes that can be introduced.

B.1 Synchronous Communication

A compartment P calls a compartment Q and is sharing memory buffer M until the point the call from P to Q is completed, for the purpose of the example—with assistance of a higher privileged compartment (arbiter). The arbiter, upon receiving the call request, creates a K-capability for the address range of buffer M in a KR-register. Q, when receiving control as part of the call process, can now access the buffer M providing other architectural rules don't prevent it. When Q returns control, the arbiter invalidates the K-capability it previously created. Since Q cannot store the K-capability to memory for later use, Q cannot access the buffer M anymore unless the access is granted again. This means temporal safety for the buffer M is preserved.

B.2 Asynchronous Communication

Similar ways of temporarily giving access to a memory buffer M are possible in asynchronous mode, i.e. when giving temporary access to another execution thread. This can be implemented with the assistance of the kernel (for example), which can transfer K values between KR-registers related to different threads of execution. For this to work correctly, the kernel might need to track ownership of address ranges to make sure the K-capabilities are only transferred by compartments authorised to do so.

B.3 Additional Changes that can be Introduced for Reducing the Number of Checks Against KR-Registers.

1. Introduce Private/Shared distinction of capabilities, and only check memory accesses using pointers or shared capabilities against KR-registers. Private capabilities are to be used within compartment that owns relevant address range, where the checks against KR-registers would be redundant.
   a. Private capabilities are turned into Shared capabilities when they are given to another compartment
   b. When a capability is loaded using a Shared capability, it is turned into a Shared capability.
2. Additionally, the check against KR-registers can be skipped for pointers which, by some means (e.g. the private pointer range information 202 described earlier), are known to be private to the executing compartment.
   a. For example, an architecture can define a system register determining the range of pointers that are considered to be private.
3. Introduce a Kv bit (e.g. Kv indicator 212 described earlier) as a hidden part of each generic register (general purpose register 50 or capability register 60) that can be passed into a memory access instruction, where:
   a. The Kv bit is:
      i. 0—when the value of the generic register hasn't yet been checked against KR-registers
      ii. 1—when the value of the generic register was checked against KR-registers and a KR-register whose bounds enclose the value's bounds was found.
   b. The Kv bit is recomputed when:
      i. the corresponding generic register's value is changed (it can be just cleared to delay re-computation in this case)
         1. there are possible (optional) optimizations so that not every change to the generic register's value leads to re-computation of the Kv bit. For example, when a generic register's value is copied from another generic register, the Kv bit can be copied with the value
      ii. when there is a request from software to recompute the Kv bit (for example, using a dedicated instruction)
      iii. optionally, when any of the KR-registers are updated (although providing support for B.3.3.b.ii can be sufficient so there is no need for hardware to automatically recompute/clear Kv when KR-registers are updated, as the software updating KR may also include the instruction for recomputing the Kv bit)
   c. The address check against the KR-registers can be skipped if the Kv bit is set.
4. Optionally, B.3.3 can be extended to relax the bound requirements by introducing effective boundary base and length fields as a hidden part of each generic register that can be passed into a memory access instruction, where:
   a. The effective boundary fields are the intersection of the boundaries specified by means of KR-registers and of the boundaries in the generic register's value itself (or of implied boundaries if any—in case the register contains a non-capability value)
   b. The Kv bit is set to 1 when the value of the generic register was checked against KR-registers, an intersecting KR-register was found, and the effective boundary hidden part was updated correspondingly
   c. The address check can be performed against the effective boundary fields if the Kv bit is set
5. Another extension of the scheme would be to support spilling/filling of the KR-registers, therefore mitigating limitations coming from number of the registers—the spilling/filling can be performed either implicitly by an arbiter or kernel, for example, or automatically—to a memory area dedicated for this purpose to each thread of execution.
6. Also, for purposes of efficiency, to avoid invalidation and reconstruction of K-capabilities, which should be accessible to calling compartment and shouldn't be accessible to called compartment, the scheme might implement a KR-register boundary which would indicate the range of KR-registers that are accessible at the moment.

Figure 14:
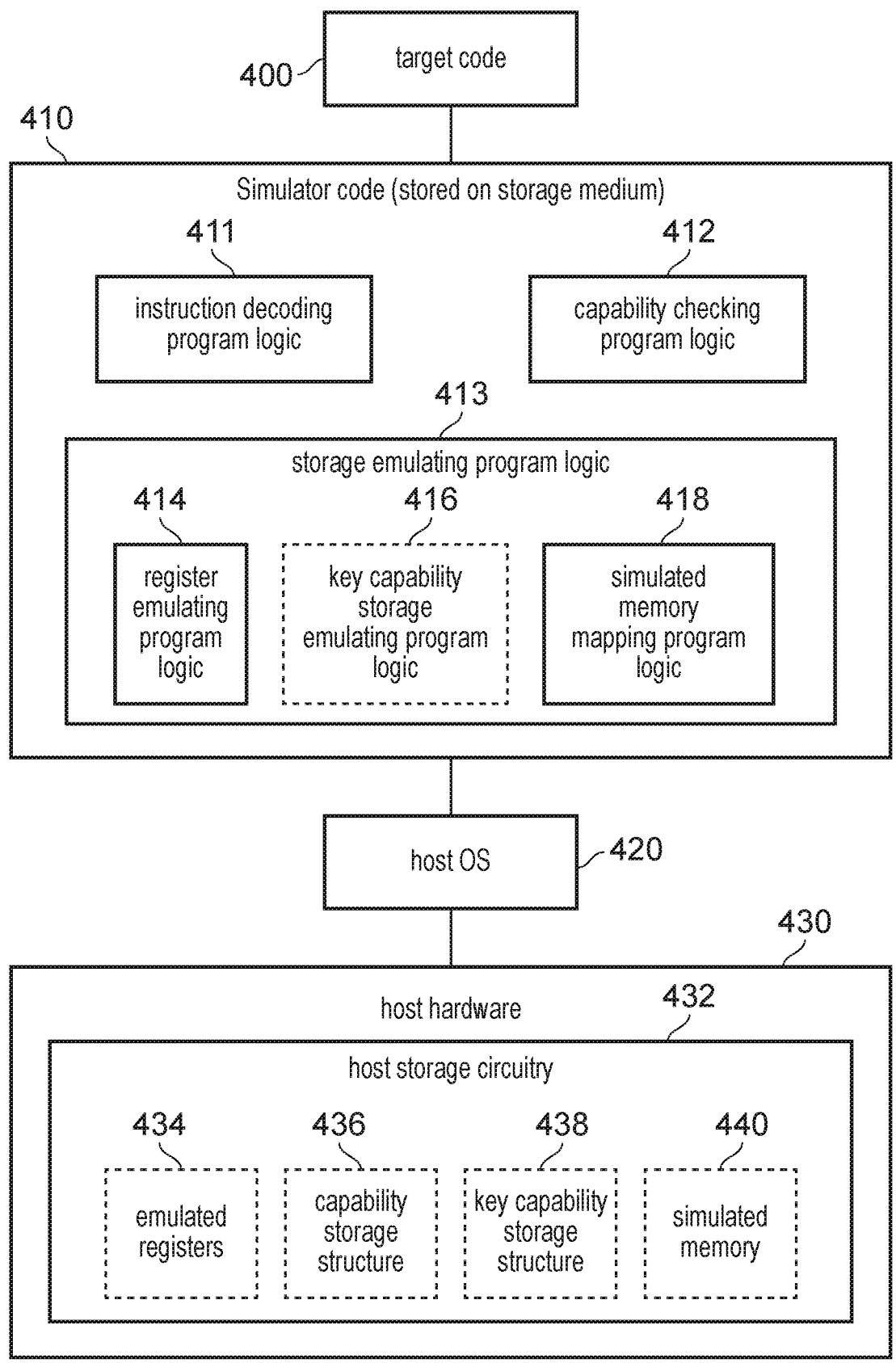
FIG. 14 shows a simulator example that may be used.

FIG. 14 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 430, optionally running a host operating system 420, supporting the simulator program 410. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 430), some simulated embodiments may make use of the host hardware, where suitable.

The simulator program 410 may be stored on a computer-readable storage medium (which may be a non-transitory medium), and provides a program interface (instruction execution environment) to the target code 400 (which may include applications, operating systems and a hypervisor) which is the same as the interface of the hardware architecture being modelled by the simulator program 410. Thus, the program instructions of the target code 400, including instructions interacting with capabilities and key capabilities as discussed above, may be executed from within the instruction execution environment using the simulator program 410, so that a host computer 430 which does not actually have the hardware features of the apparatus 2 discussed above can emulate these features.

The simulator code 410 may include instruction decoding program logic 411 which decodes instructions of the target code 400 to map them to corresponding instructions in the native instruction set supported by the host, to control the host 430 to perform equivalent functionality to the operations represented by the instructions of the target code 400.

Capability checking program logic 412 is provided, defining instructions for controlling the host hardware 430 to perform capability checks and key capability checks applying similar checking criteria to the checks performed in hardware by the capability checking circuitry 80 in the example of FIG. 1.

The simulator code 410 also includes storage emulating program logic 413 which includes instructions for maintaining and accessing various data structures within host storage circuitry 432 (e.g. host registers and/or host memory) of the host apparatus 430 which emulate data storage which would be provided in hardware in the example of FIG. 1.

For example, register emulating program logic 414 may track addresses in the host storage which represent emulated registers 434 corresponding to the architectural registers 50, 52, 56, 60 which would be expected to be present in hardware in the example of FIG. 1. When an instruction of the target code 400 references a particular architectural register, the register emulating program logic 414 causes the corresponding emulated instructions generated by instruction decoding program logic 411 to request access to the locations in the emulated register data structure 434 that correspond to the required simulated architectural state. The architectural registers emulated by register emulating program logic 414 include capability registers 60 and so a capability storage structure 436 is maintained in host storage (although shown separately in FIG. 14, in other examples the capability storage structure 436 may be considered part of the emulated registers 434).

When the target code 400 executes load/store instructions (which if executed on a hardware apparatus would access to caches 30, 32 or memory 34), in the simulated environment these instructions actually access a simulated memory space 440 which is maintained in host storage 432 by simulated memory mapping program logic 418. The simulated memory mapping program logic 418 could also include program logic for emulating address translation or memory protection functions similar to operations that would be performed by the MMU 28 in a hardware embodiment.

Key capability storage emulating program logic 416 can also be provided to maintain a simulated data structure 438 in host storage corresponding to the key capability storage 90 of FIG. 1. If the key capability storage 90 is implemented architecturally as registers, the key capability storage emulating program logic 416 and key capability storage structure 438 could be regarded as part of the register emulating program logic 414 and emulated registers 434 respectively. If the key capability storage 90 is implemented architecturally as a region in memory, the key capability storage emulating program logic 416 and key capability storage structure 438 could be regarded as part of the simulated memory program logic 418 and simulated memory space 440 respectively.

Hence, the simulator code 410 may provide support for key capabilities in a similar way to the hardware example of FIG. 1, to allow the same target code 400 to execute on either the example of FIG. 1 or the example of FIG. 14 with temporal safety being provided using the key capabilities.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

processing circuitry to perform data processing in response to instructions;

capability storage circuitry to store at least one capability specifying bounded information and bounds indicating information indicative of permissible bounds for the bounded information;

key capability storage circuitry to store at least one key capability specifying key bounds indicating information indicative of permissible bounds for information specified by any one or more of: a non-capability operand, a capability stored in the capability storage circuitry, and the key capability itself; and capability checking circuitry to determine whether an operation to be performed by the processing circuitry is allowed based on bounds checking using the bounds indicating information and the key bounds indicating information; in which:

for a given software compartment executed by the processing circuitry, which lacks a key capability operating privilege associated with at least a portion of the key capability storage circuitry, the processing circuitry is configured to prohibit the given software compartment from causing the processing circuitry to perform one or both of:

a first transfer operation to transfer a key capability from said at least a portion of the key capability storage circuitry to the capability storage circuitry or a memory location selected by the given software compartment; and a second transfer operation to transfer a key capability to said at least a portion of the key capability storage circuitry from the capability storage circuitry or the memory location selected by the given software compartment.

2. The apparatus according to claim 1, in which, in at least one mode of operation of the processing circuitry, in response to an operation to be performed by the processing circuitry with reference to a given capability stored in the capability storage circuitry, the capability checking circuitry is configured to perform combined capability bounds checking to check whether a non-capability operand or the bounded information of the given capability satisfies both the permissible bounds indicated by the bounds indicating information of the given capability and the permissible bounds indicated by the key bounds indicating information of at least one key capability stored in the key capability storage circuitry.

3. The apparatus according to claim 1, in which, in at least one mode of operation of the processing circuitry, in response to the processing circuitry requesting a memory access to a target address, the capability checking circuitry is configured to determine that the memory access is not permitted when there is no valid key capability stored in the key capability storage circuitry for which the target address is within the permissible bounds indicated by the key bounds indicating information.

4. The apparatus according to claim 1, in which the processing circuitry is configured to prohibit the given software compartment lacking the key capability operating privilege from creating a new key capability.

5. The apparatus according to claim 1, in which the processing circuitry is configured to support one or more key capability manipulating instruction for manipulating key capabilities stored in the key capability storage circuitry.

6. The apparatus according to claim 5, in which the processing circuitry is configured to signal a fault in response to an attempt, by a software compartment lacking the key capability operating privilege for a given portion of the key capability storage circuitry, to execute a key capability manipulating instruction for manipulating a key capability stored in the given portion of the key capability storage circuitry.

7. The apparatus according to claim 1, in which the processing circuitry is configured to execute a software compartment in one of an executive state and a restricted state;
a software compartment executed in the executive state has the key capability operating privilege; and
a software compartment executed in the restricted state lacks the key capability operating privilege.

8. The apparatus according to claim 1, in which the processing circuitry is configured to determine whether a software compartment has the key capability operating privilege based on range information defining at least one range of instruction addresses associated with the key capability operating privilege.

9. The apparatus according to claim 1, in which the processing circuitry is configured to control assignment of the key capability operating privilege separately for different portions of the key capability storage circuitry.

10. The apparatus according to claim 1, in which:
in response to an instruction executed by the processing circuitry to request transfer of a target capability from memory to the capability storage circuitry, the processing circuitry is configured to determine whether the target capability is a key-capability-type of capability, and to reject the transfer of the target capability to the capability storage circuitry when the target capability is the key-capability-type of capability.

11. The apparatus according to claim 1, in which a key capability stored in the key capability storage circuitry has a different capability format to a capability stored in the capability storage circuitry.

12. The apparatus according to claim 1, in which, in at least one mode of operation of the processing circuitry:
the capability checking circuitry is configured to determine, for an operation to be performed by the processing circuitry using a non-capability operand or a given capability, whether private/shared information indicates that the non-capability operand or the given capability is private or shared;
when the non-capability operand or the given capability is shared, the capability checking circuitry is configured to determine whether the operation is permitted based on whether the non-capability operand or the bounded information of the given capability satisfies key bounds indicating information of at least one key capability stored in the key capability storage circuitry; and
when the non-capability operand or the given capability is private, the capability checking circuitry is configured to determine whether the operation is permitted independent of whether the non-capability operand or the bounded information of the given capability satisfies key bounds indicating information of at least one key capability stored in the key capability storage circuitry.

13. The apparatus according to claim 12, in which the processing circuitry is configured to convert a capability from private to shared when:
the capability is made accessible to a software compartment not previously having access to the capability;
the capability is loaded to the capability storage circuitry from memory under control of a shared capability; or
the capability is stored to memory from the capability storage circuitry under control of a shared capability.

14. The apparatus according to claim 1, in which the capability checking circuitry has access to key capability active status information indicating which portions of the key capability storage circuitry are active or inactive, and the capability checking circuitry is configured to determine whether an operation subject to key capability checking is permitted based on one or more key capabilities stored in at least one active portion of the key capability storage circuitry, independent of one or more key capabilities stored in at least one inactive portion of the key capability storage circuitry.

15. The apparatus according to claim 1, in which, for an operation subject to key capability checking to be performed with reference to a given non-capability operand or a given capability, the capability checking circuitry is configured to determine, based on a key capability check success indicator associated with the given non-capability operand or the given capability, whether a key capability check is required, the key capability check success indicator indicating whether the key capability check for the given non-capability operand or the given capability has previously been determined to be successful.

16. The apparatus according to claim 15, in which at least one of the processing circuitry and the capability checking circuitry is configured to clear or recompute the key capability check success indicator in response to an update to the given non-capability operand, the given capability or a key capability.

17. The apparatus according to claim 1, in which:
the processing circuitry or the capability checking circuitry is configured to set effective bounds information associated with a given non-capability operand or a given capability to indicate effective bounds corresponding to an intersection between the permissible bounds indicated by the key bounds indicating information specified by at least one key capability and the permissible bounds indicated by default bounds indicating information associated with the given non-capability operand or the bounds indicating information specified by the given capability; and in response to an operation subject to key capability checking to be performed with reference to the given non-capability operand or the given capability, the capability checking circuitry is configured to perform bounds checking with reference to the effective bounds information associated with the given non-capability operand or the given capability.

18. The apparatus according to claim 1, in which the processing circuitry is configured to allow the given software compartment lacking the key capability operating privilege to cause the processing circuitry to transfer a capability between the capability storage circuitry and a memory location selected by the given software compartment.

19. A method comprising:
storing, in capability storage circuitry, at least one capability specifying bounded information and bounds indicating information indicative of permissible bounds for the bounded information;
storing, in key capability storage circuitry, at least one key capability specifying key bounds indicating information indicative of permissible bounds for information specified by any one or more of: a non-capability operand, a capability stored in the capability storage circuitry, and the key capability itself; and
determining whether an operation to be performed by processing circuitry is allowed based on bounds checking using the bounds indicating information and the key bounds indicating information; in which:
for a given software compartment executed by the processing circuitry, which lacks a key capability operating privilege associated with at least a portion of the key capability storage circuitry, the processing circuitry prohibits the given software compartment from causing the processing circuitry to perform one or both of:
a first transfer operation to transfer a key capability from said at least a portion of the key capability storage circuitry to the capability storage circuitry or a memory location selected by the given software compartment; and
a second transfer operation to transfer a key capability to said at least a portion of the key capability storage circuitry from the capability storage circuitry or the memory location selected by the given software compartment.

20. A non-transitory computer-readable storage medium storing a computer program to control a host data processing apparatus to provide an instruction execution environment for execution of target code; the computer program comprising:
instruction decoding program logic to decode instructions of the target code to control the host data processing apparatus to perform data processing in response to the instructions of the target code;
storage emulating program logic to maintain, in host storage circuitry of the host data processing apparatus:
a capability storage structure to store at least one capability specifying bounded information and bounds indicating information indicative of permissible bounds for the bounded information; and
a key capability storage structure to store at least one key capability specifying key bounds indicating information indicative of permissible bounds for information specified by any one or more of: a non-capability operand, a capability stored in the capability storage structure, and the key capability itself; and
capability checking program logic to determine whether an operation to be performed in response to the instructions of the target code is allowed based on bounds checking using the bounds indicating information and the key bounds indicating information; in which:
for a given software compartment of the target code, which lacks a key capability operating privilege associated with at least a portion of the key capability storage structure, the instruction decoding program logic is configured to prohibit the given software compartment from causing the host data processing apparatus to perform one or both of:
a first transfer operation to transfer a key capability from said at least a portion of the key capability storage structure to the capability storage structure or a simulated memory location selected by the given software compartment; and
a second transfer operation to transfer a key capability to said at least a portion of the key capability storage circuitry from the capability storage structure or the simulated memory location selected by the given software compartment.

* * * * *